(12) United States Patent
Bragg

(10) Patent No.: US 12,523,825 B2
(45) Date of Patent: Jan. 13, 2026

(54) DEFLECTIVE STRUCTURE TO ENHANCE INTERFERENCE FIT OF INSTALLED CONNECTORS AND ADAPTERS

(71) Applicant: Leviton Manufacturing Co., Inc., Melville, NY (US)

(72) Inventor: Charles R Bragg, Bothell, WA (US)

(73) Assignee: LEVITON MANUFACTURING CO., INC., Melville, NY (US)

( * ) Notice: Subject to any disclaimer, the term of this patent is extended or adjusted under 35 U.S.C. 154(b) by 292 days.

(21) Appl. No.: 18/499,507

(22) Filed: Nov. 1, 2023

(65) Prior Publication Data

US 2025/0138253 A1 May 1, 2025

(51) Int. Cl.
*G02B 6/00* (2006.01)
*G02B 6/38* (2006.01)

(52) U.S. Cl.
CPC ......... *G02B 6/3897* (2013.01); *G02B 6/3825* (2013.01); *G02B 6/3893* (2013.01)

(58) Field of Classification Search
CPC .. G02B 6/3897; G02B 6/3825; G02B 6/3893; G02B 6/44528; G02B 6/4454; G02B 6/00
See application file for complete search history.

(56) References Cited

U.S. PATENT DOCUMENTS

| | | | |
|---|---|---|---|
| 7,255,485 B2 * | 8/2007 | Thaler | G02B 6/3825 385/63 |
| 9,279,940 B2 * | 3/2016 | Mamiya | G02B 6/3893 |
| 10,101,570 B1 * | 10/2018 | Zhou | G02B 21/002 |

* cited by examiner

*Primary Examiner* — Jennifer Doan
(74) *Attorney, Agent, or Firm* — Amin, Turocy & Watson, LLP

(57) ABSTRACT

A fiber optic adapter faceplate comprises port openings and associated structural features designed to tightly hold fiber optic adapters or connectors in a secure manner that prevents sliding or rattling within the port openings. This is achieved in part by a raised button or protrusion formed on a horizontal edge of the port opening, which works together with a curved slot formed through the faceplate near the button to allow the edge of the port to deflect locally when an adapter or connector is inserted, providing a tight fit across a range of varying adapter dimensions.

20 Claims, 24 Drawing Sheets

DEFLECTIVE STRUCTURE TO ENHANCE INTERFERENCE FIT OF INSTALLED CONNECTORS AND ADAPTERS

TECHNICAL FIELD

The disclosed subject matter relates generally to fiber optic cassette faceplates and associated adapters or connectors.

BACKGROUND

Fiber optic cables are often used as a medium for telecommunication and computer networking due to their flexibility, high data capacity, and immunity to interference. Since light is used as the data transmission medium, fiber optic cables can carry data over long distances with little attenuation relative to electrical data transmission. Fiber optic cables are used in many types of applications, including local area networks that use optical transceivers, corporate intranets that deploy optical pathways for high-speed transmission of data on a corporate campus, or other such data transmission applications. In many fiber optic systems, fiber optic adapters are used to detachably interface connectorized optical fibers with other fiber segments.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

Various embodiments described herein provide a fiber optic adapter faceplate having adapter port openings and associated structural features that tightly secure fiber optic adapters within the port openings across a range of adapter dimensions. To this end, each port opening has a raised button formed on a horizontal edge of the opening, and an associated relief slot is formed through the faceplate near the button. This configuration allows the port opening to deflect sufficiently to accommodate a range of adapter dimensions, while also applying a compression force via the raised button that secures the adapter tightly within the port opening and prevents the adapter from sliding or rattling within the port.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description may include additional or alternative embodiments beyond those described in this summary.

DETAILED DESCRIPTION

Figure 1:
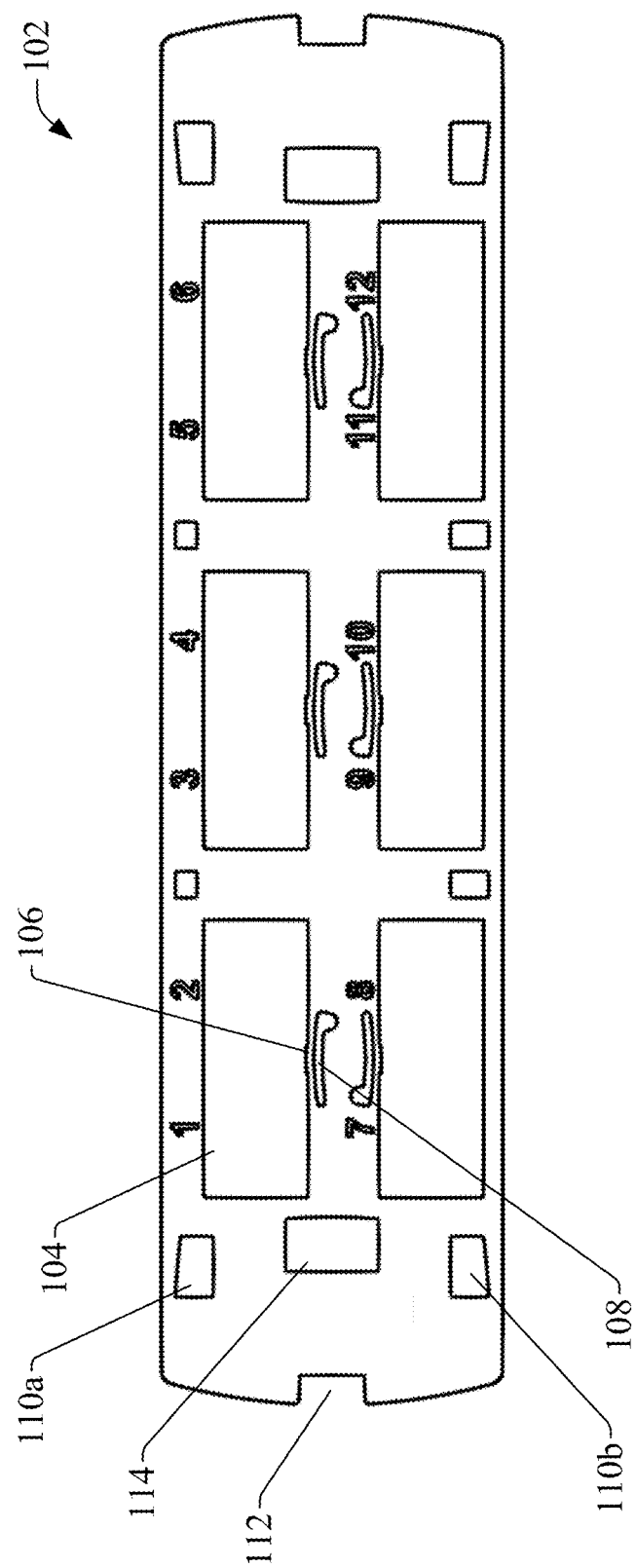
FIG. 1 is a front view of an example fiber optic adapter faceplate.

The subject disclosure is now described with reference to the drawings wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Some reference numbers used herein to label illustrated components are suffixed with letters to delineate different instances of a same or similar component. In general, if a reference number without an appended letter is used within this disclosure, the descriptions ascribed to the reference number are to be understood to be applicable to all instances of that reference number with or without an appended letter unless described otherwise.

In many fiber optic systems, fiber optic adapters are used to detachably interface connectorized optical fibers with other fiber segments. In some systems, these adapters are mounted through port openings of a faceplate, which itself can be installed on the front of a fiber optic cassette, patch panel, or another type of fiber enclosure. The port openings of these faceplates typically have a shape that conforms to a simple geometry that, while broadly conforming to the cross-sectional profile of the fiber optic adapter to be installed in the openings, leaves an undesired degree of tolerance between the port opening and adapter. This excess tolerance allows the adapter to slide or rattle within its port opening even while the adapter is fully mounted within the opening. Inconsistencies in the process used to manufacture the adapters contribute to this problem by permitting a degree of variability in the adapters' physical dimensions. The differences between the size of the adapter and the size of the port opening allow the adapter to slide or rattle freely within the port opening even while retained by side-snaps, which creates a perception of low quality and can cause vibration concerns. Some manufacturers address this issue using an additional plate that mounts to the back of the faceplate and pinches the adapters rigidly within the port adapter. However, this solution requires an additional part (the rear plate), and therefore increases the manufacturing cost and complexity of the system.

To address these and other issues, one or more embodiments described herein provide a fiber optic adapter faceplate comprising port openings and associated structural features designed to tightly hold fiber optic adapters or connectors in a secure manner that prevents sliding or rattling within the port openings. This is achieved in part by a raised button or protrusion formed on a horizontal edge of the port opening, which works together with a curved relief slot formed through the faceplate near the button to allow the edge of the port to deflect locally when an adapter or connector is inserted, providing a tight fit across a range of varying adapter dimensions.

Figure 2:
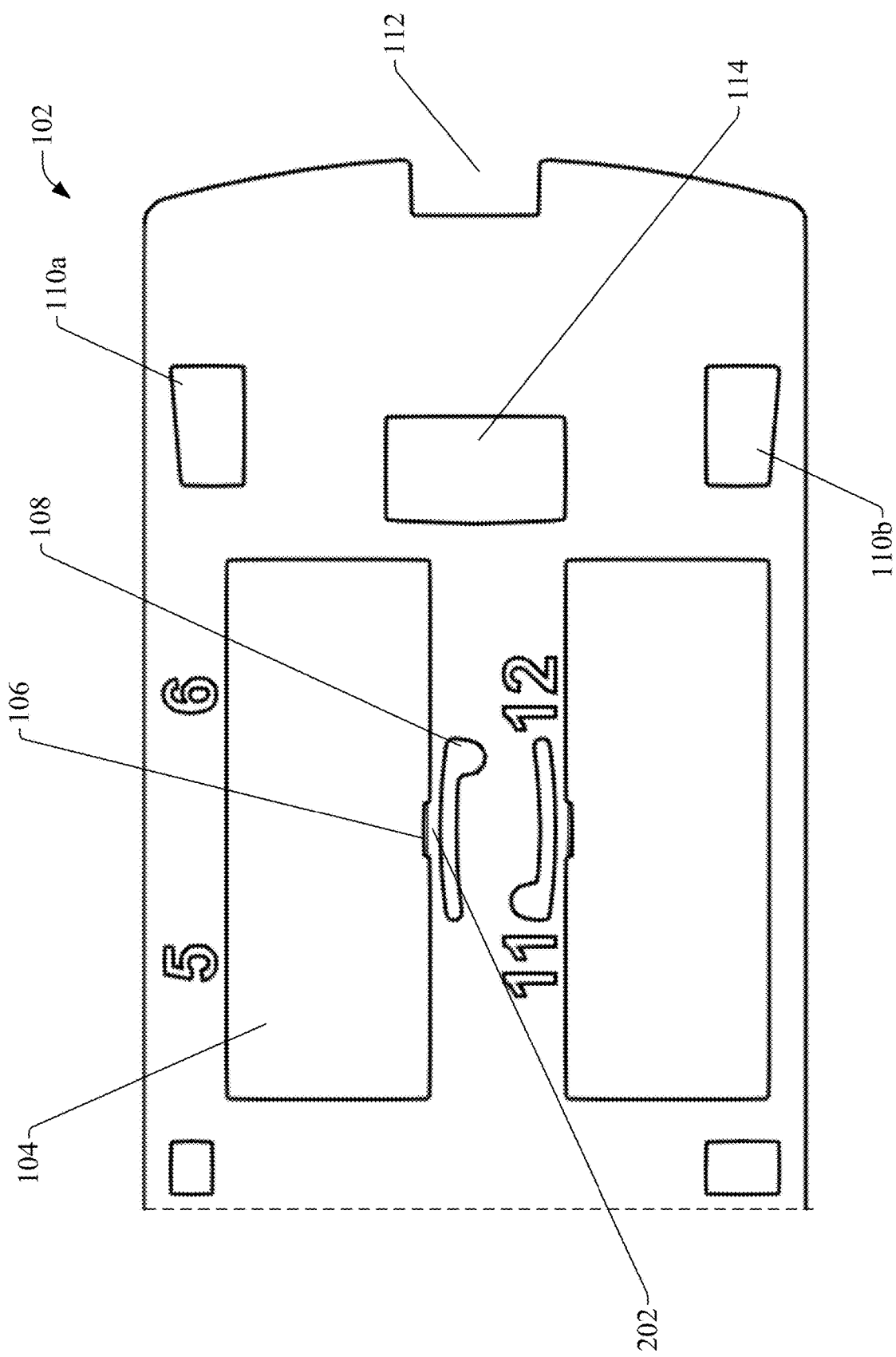
FIG. 2 is a close-up view of two port openings of the faceplate.

FIG. 1 is a front view of an example fiber optic adapter faceplate 102 according to one or more embodiments. FIG. 2 is a close-up view of two port openings 104 of the faceplate 102. Faceplate 102 comprises a flat plate through which one or more port openings 104 are formed. In the illustrated example, faceplate 102 comprises six port openings 104 arranged in a 3×2 array; however, other port arrangements are also within the scope of one or more embodiments. Port openings 104 have a substantially rectangular shape, which broadly corresponds to the cross-sectional profile or footprint of a fiber optic adapter or connector to be mounted in the port openings 104. As can be seen in FIG. 2, a raised button 106 or pad is formed on one of the horizontal edges of each port opening 104. A curved slot 108 is formed through the faceplate 102 near the horizontal edge on which the raised button 106 is formed. As can be seen in FIG. 2, a flexible section 202 is defined between the horizontal edge of the port opening 104 on which the button is formed and the slot 108. A pair of mounting holes 110a and 110b are formed near each of the left end and the right end of the faceplate 102, with mounting hole 110a being formed near the top edge of the faceplate 102 and mounting hole 110b being formed near the bottom edge of the faceplate 102. Between these mounting holes 110a and 110b, a middle mounting hole 114 is also formed near the left and right ends of the faceplate 102. A notch 112 is formed on each of the left-most edge and right-most edge of the faceplate 102.

Figure 3:
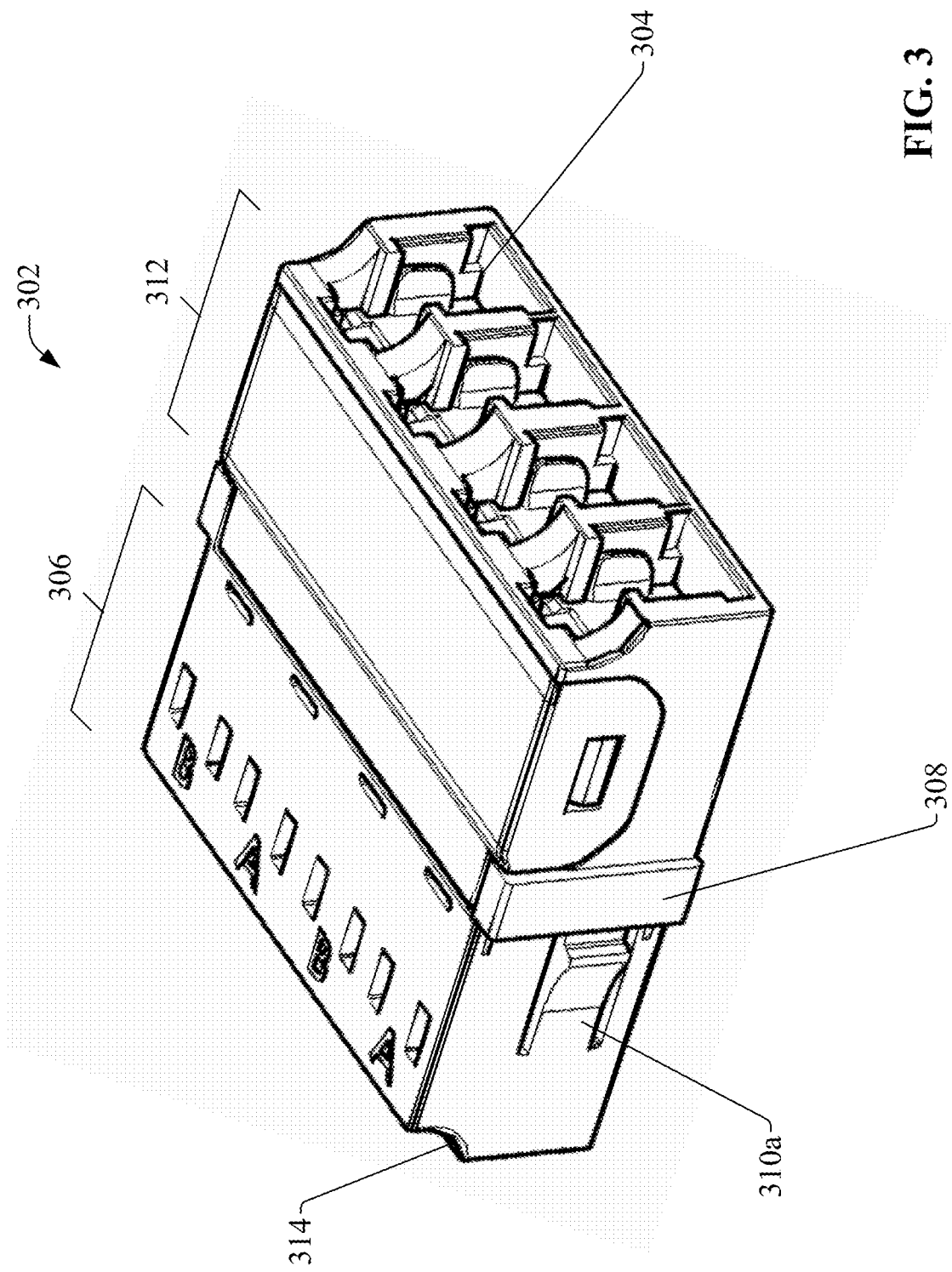
FIG. 3 is a perspective view of an example adapter that can be inserted into one of the port openings of the faceplate.
Figure 4:
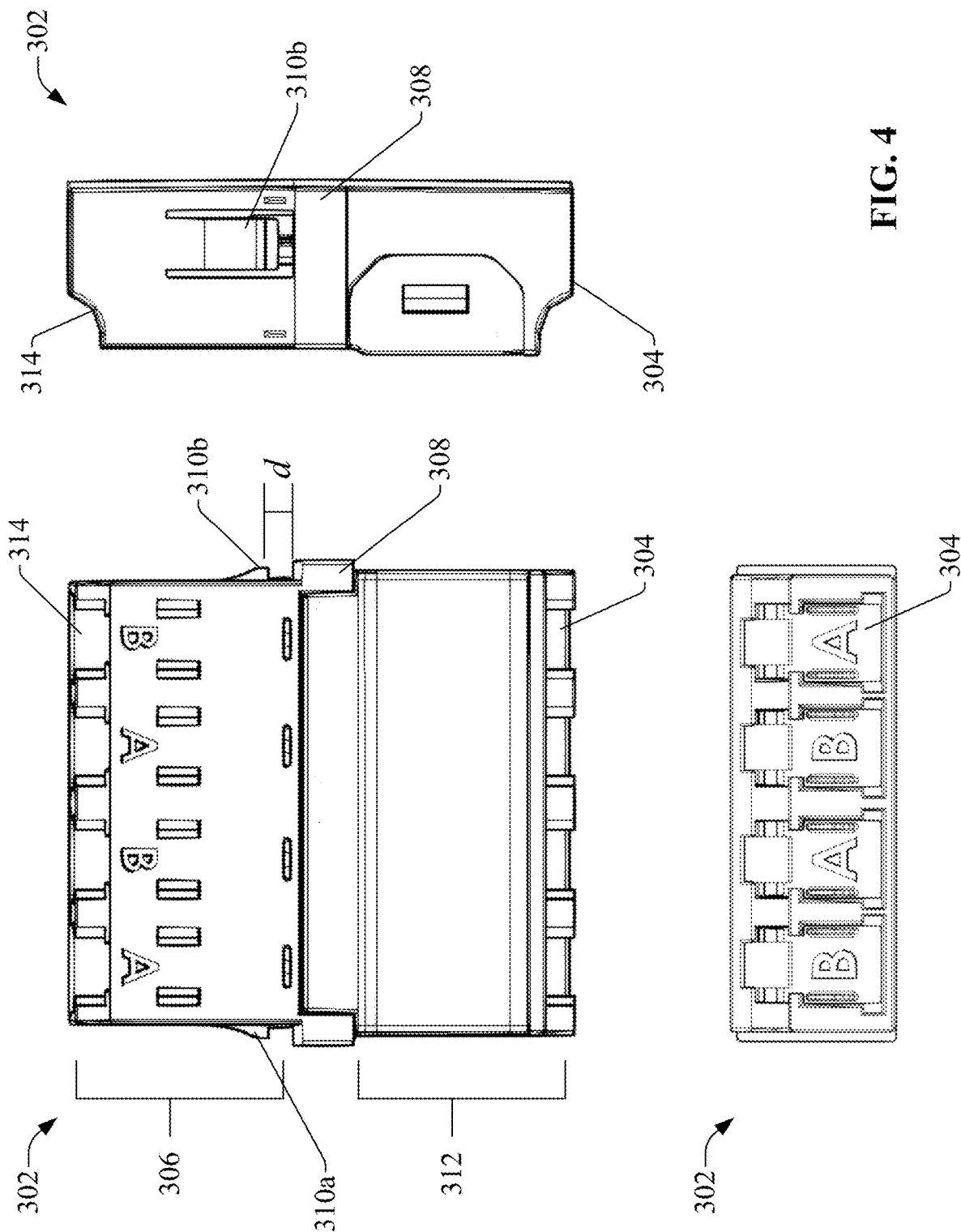
FIG. 4 is an orthographic projection view of the adapter.

FIG. 3 is a perspective view of an example adapter 302 that can be inserted into one of the port openings 104 of faceplate 102. FIG. 4 is an orthographic projection view of the adapter 302. Adapter 302 can be any type of fiber adapter configured to receive fiber connectors of substantially any type via its front ports 304, including but not limited to Lucent Connector (LC) connectors, LC duplex connectors, Subscriber Connector (SC) connectors, multi-fiber connectors (MPO, MTP), miniature duplex connectors (MDC), small form factor connectors, very small form factor connectors, MMC connectors, or other types of fiber connectors. Individual optical fibers (e.g., fibers of a fiber optic pigtail) can be terminated on the rear side of the adapters 302. Fiber optic connectors terminating other optical fibers (not shown) can be plugged into connector ports 304 on the front of the adapter 302. The adapter 302 provides connectivity between the individual fibers terminated on the rear side of the adapter 302 and the fibers terminated by the connectors that are plugged into the ports 304 on the front of the adapter 302. In the illustrated example, a raised ridge 308 runs across all four sides of the adapter 302, and separates the rear side 306 of the adapter 302 from the front side 312 of the adapter 302. A retractable spring-loaded clip 310 is formed on each of the left and right vertical surfaces of the rear side 306 of the adapter 302, and are positioned on the adapter 302 such that the distance d between each clip 310a, 310b and the ridge 308 (see FIG. 4) is slightly longer than a thickness of the faceplate 102.

Figure 5:
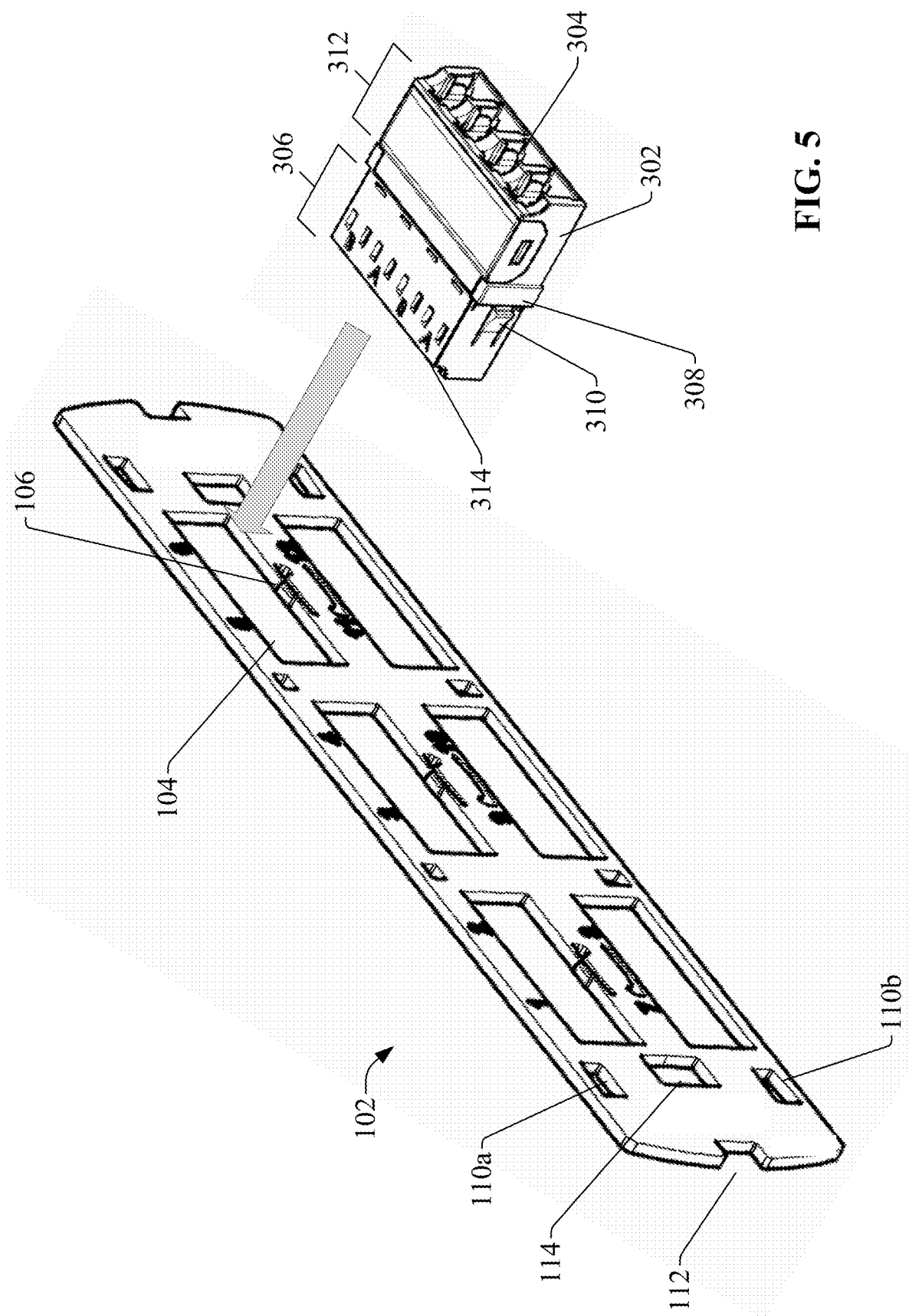
FIG. 5 is a perspective view of the fiber optic adapter faceplate in which a fiber optic adapter is aligned for insertion into one of the faceplate's port openings.
Figure 6:
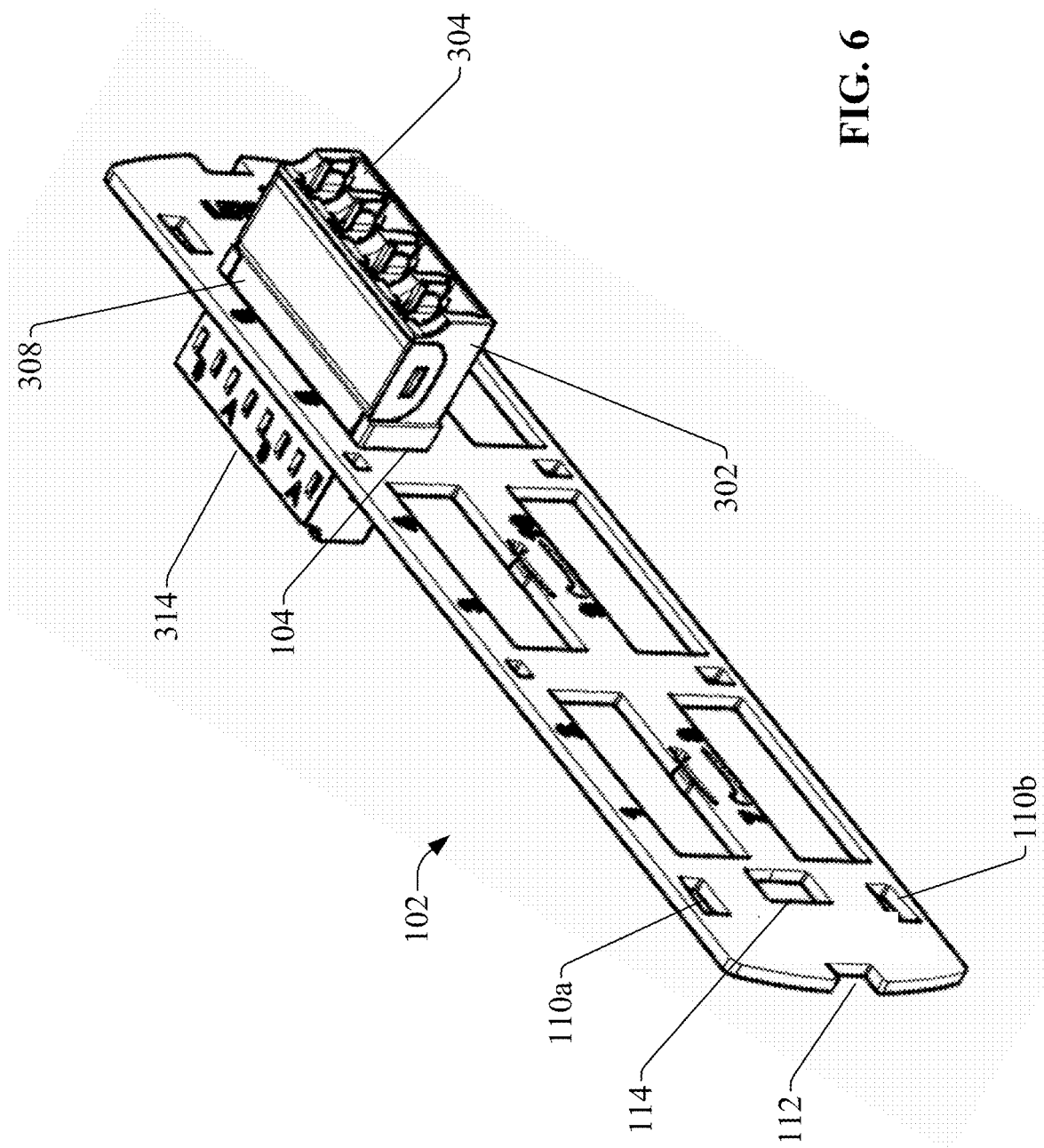
FIG. 6 is a perspective view of the fiber optic adapter faceplate in which the fiber optic adapter has been inserted through, and mounted within, the port opening.

FIG. 5 is a perspective view of the fiber optic adapter faceplate 102 in which the fiber optic adapter 302 is aligned for insertion into one of the port openings 104. FIG. 6 is a perspective view of the fiber optic adapter faceplate 102 in which the fiber optic adapter 302 has been inserted through, and mounted within, the port opening 104. The port openings 104 have a shape that substantially matches the cross-sectional profile or footprint of the rear side 306 of the adapter 302 (a rectangular footprint in the illustrated example), with dimensions that are slightly larger than those of the rear side 306 to allow the adapter 302 to be inserted through the port opening 104. As the rear side 306 is pushed into the port opening 104, the inclined surfaces of the spring-loaded clips 310a, 310b on the left and right sides of the adapter 302 make contact with the vertical edges of the port opening 104, causing the clips 310a, 310b to retract into the adapter 302. Ridge 308 has a profile whose dimensions are larger than those of the port openings 104. When the adapter 302 is inserted into the port opening 104 such that the ridge 308 abuts against the faceplate 102, the clips 310a, 310b are pushed beyond the vertical edges of the port opening 104, allowing the spring-loaded compression of the retracted clips 310a, 310b to snap the clips 310a, 310b back to their non-retracted states. This retains the adapter 302 in place in the port opening 104 due to the contact between the clips 310a, 310b and the rear surface of the faceplate 102 (which prevents forward movement of the adapter 302), and between the ridge 308 and the front surface of the faceplate 102 (which prevents rearward movement of the adapter 302).

Figure 7A:
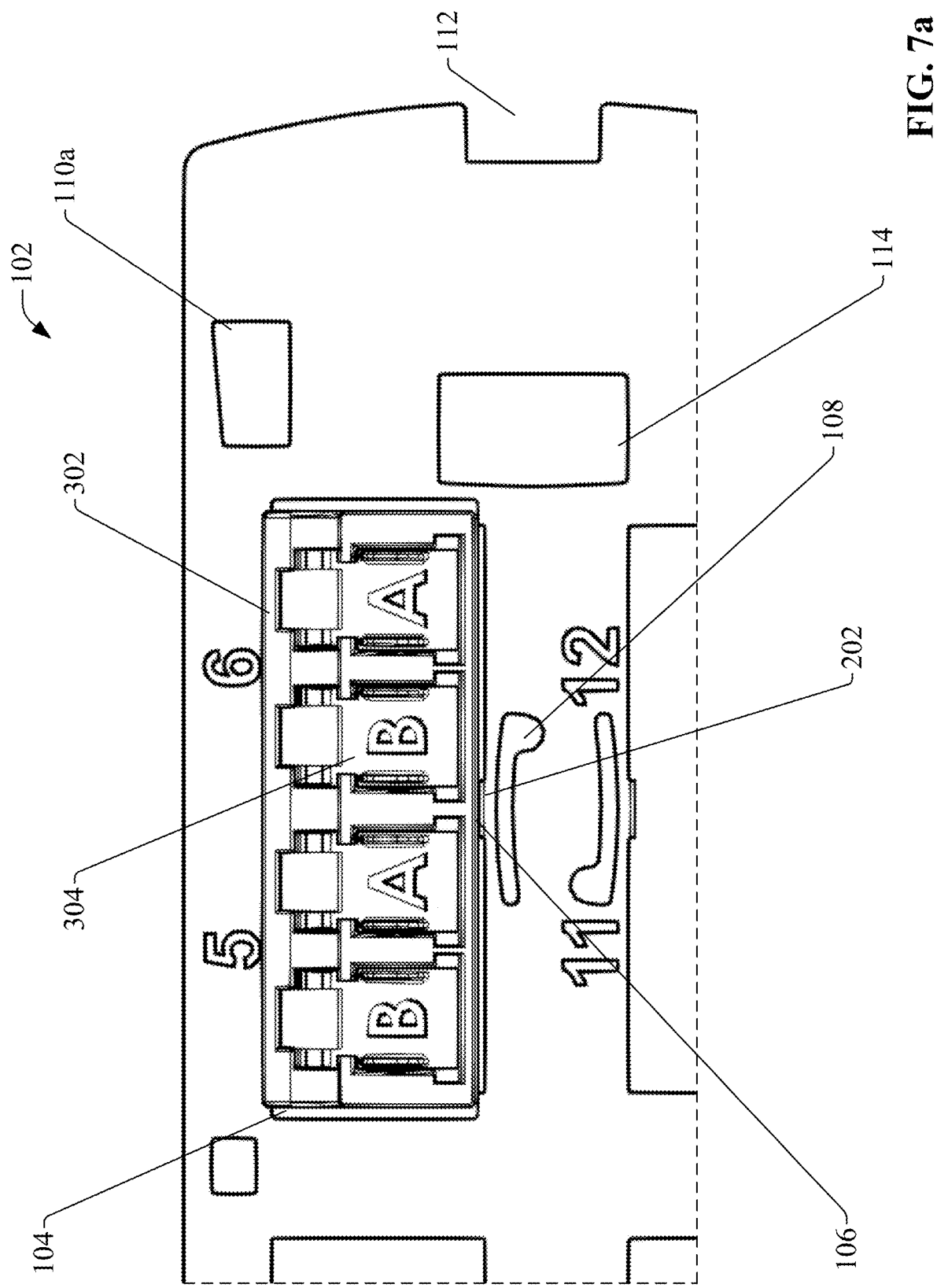
FIG. 7a is a close-up front view of the port opening with the adapter installed.
Figure 7B:
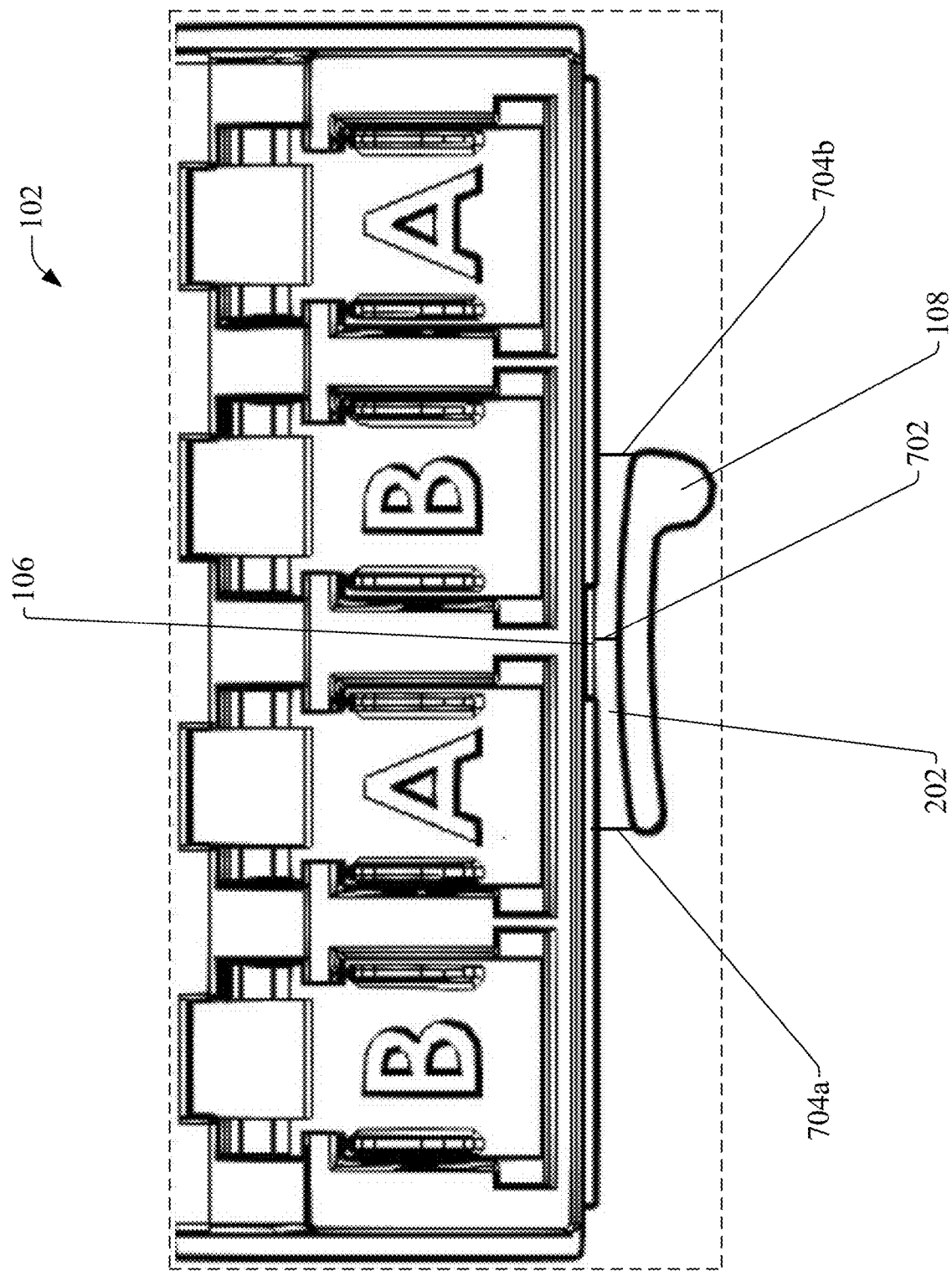
FIG. 7b is a close-up front view of the port opening illustrating a tapered flexible section below the port opening.

FIG. 7a is a close-up front view of the port opening 104 with the adapter 302 installed. As noted above, the height of the rear side 306 of the adapter 302 is slightly smaller than the height of the port opening 104. However, the raised button 106 on one of the horizontal edges of the port opening 104 is large enough to make contact with the adapter 302 when the adapter 302 is inserted into the port opening 104. Consequently, while the adapter 302 is installed in the port opening 104, the surface of the adapter 302 corresponding to the edge of the port opening 104 on which the raised button 106 is formed presses on the button 106. The force applied to the button 106 by the adapter 302 causes the flexible section 202 adjacent to the button 106 to deflect into the curved slot 108. While the adapter 302 is installed, the spring-loaded compression created by the deflection of the flexible section 202 maintains a compression force between the button 106 and the adapter 302 which holds the adapter 302 tightly within the port opening 104 and prevents sliding of the adapter 302 within the port opening 104. As shown in FIG. 7a, the curved shape of the slot 108 arcs away from its corresponding port opening 104, which yields a flexible section 202 having a tapered middle section relative to the two ends of the flexible section 202. FIG. 7b is a closer view of the port opening 104 illustrating the tapered middle section of the flexible section 202. As can be seen in this view, the arc of the slot 108 causes the distance between the middle section of the slot 108 and the bottom edge of the port opening 104 (represented by vertical line 702) to be shorter than the distances between the ends of the slot 108 and the bottom edge of the port opening 104 (represented by vertical lines 704a and 702b). This configuration can promote a greater spring force when the flexible section 202 is deflected relative to a straight slot that is parallel with the edge of the port opening 104. The raised button 106 is limited to a localized portion of the horizontal edge of the port opening 104 so that the adapter 302 can be easily inserted into the port opening 104 while still receiving sufficient compression force from the button 106 to hold the adapter 302 tightly in place.

The fiber optic faceplate 102 can be made of any suitable material, such as cold rolled steel or another metal that can sustain the deflection force applied to the flexible sections 202. The faceplate 102 can be manufactured in part using wire electrode discharge milling (EDM), laser cutting, or another suitable process. The faceplate 102 can be produced in bulk by stacking unprocessed plates and cutting the port openings 104 and curved slots 108 in all the plates simultaneously using wire EDM or a laser cutting process.

Figure 8:
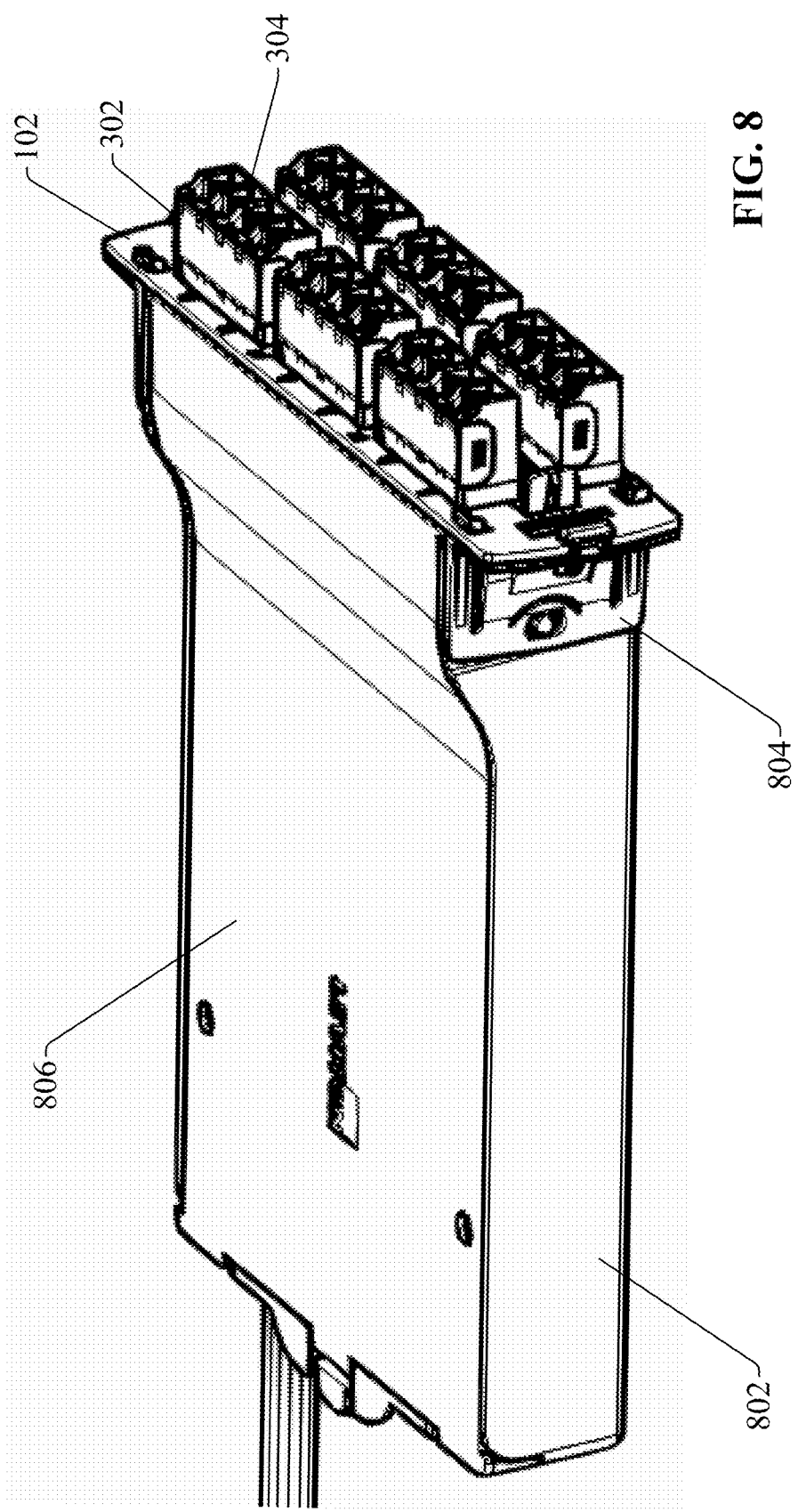
FIG. 8 is a perspective view of a fiber optic cassette on which the faceplate has been installed.
Figure 9:
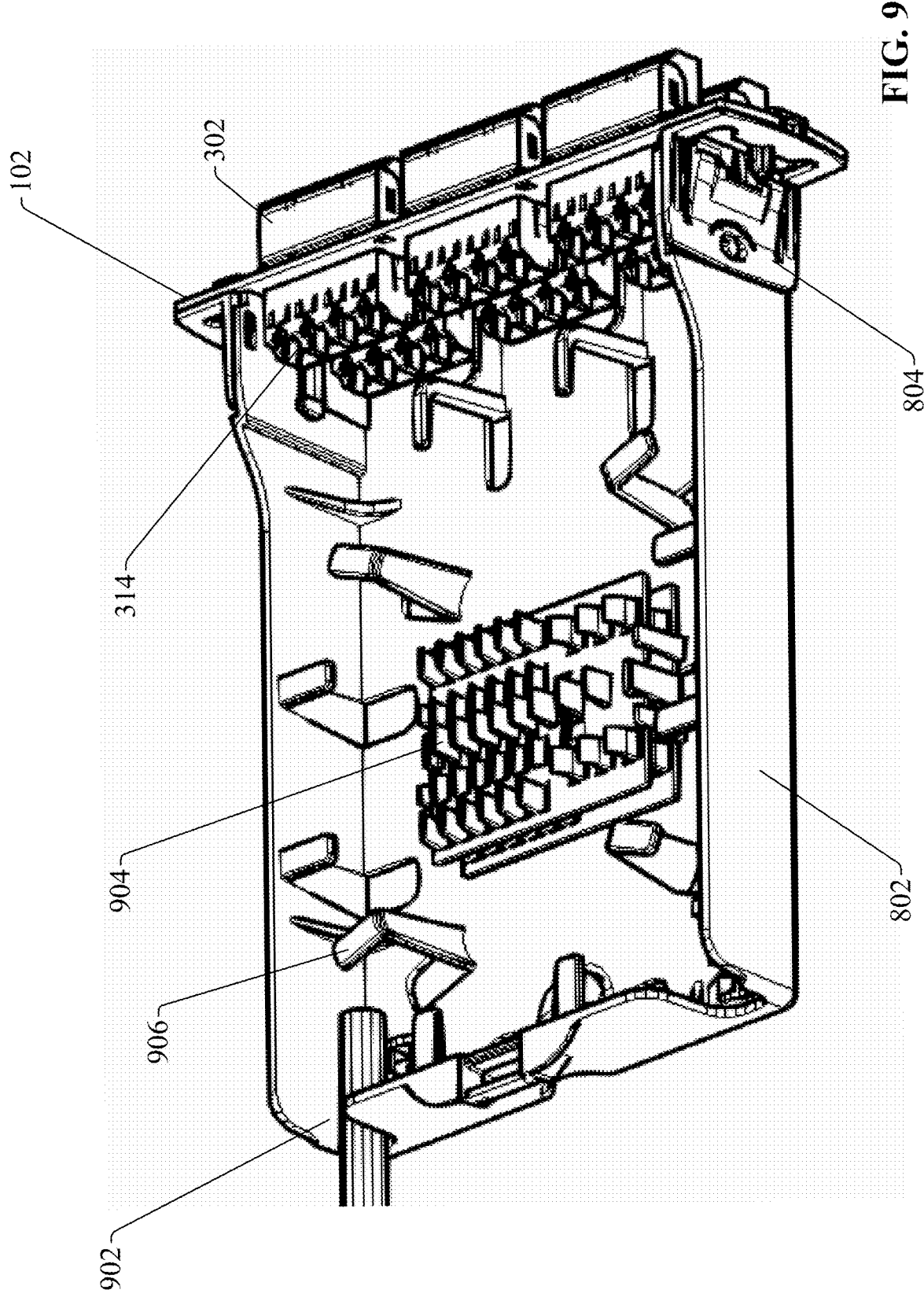
FIG. 9 is another perspective view of the fiber optic cassette with the top cover of the cassette removed to reveal the interior of the cassette.

Faceplate 102 can be provided as a stand-alone adapter plate, or may be provided as a modular component configured to be installed on a fiber optic cassette or another type of fiber optic enclosure. FIG. 8 is a perspective view of a fiber optic cassette 802 with top cover 806 on which the faceplate 102 has been installed. FIG. 9 is another perspective view of the fiber optic cassette 802 with the top cover 806 of the cassette removed to reveal the interior of the cassette 802. Fiber optic cassette 802 can be used to organize and manage fiber optic connections within enclosures. A fiber optic cable 902 can enter the cassette 802 through an opening on the rear side of the cassette 802, and individual fibers of the cable can be separated out and terminated to fiber optic connectors installed in ports on the rear sides 314 of the fiber optic adapters 302 mounted on the front of the cassette 802. Fiber optic connectors terminating other optical fibers (not shown) can be plugged into the front-facing connector ports 304 on the front of the adapters 302. The adapters 302 provide connectivity between the individual fibers terminated to fiber optic connectors installed in ports on the rear sides 314 of the adapters 302 and the fibers terminated by the connectors that are plugged into the ports 304 of the adapter 302. Winding structures 906 can be formed inside the cassette 802 to assist with routing and organizing excess fiber, and a splice holder 904 can be mounted within the cassette 802 to hold and organize fiber splices.

Figure 10A:
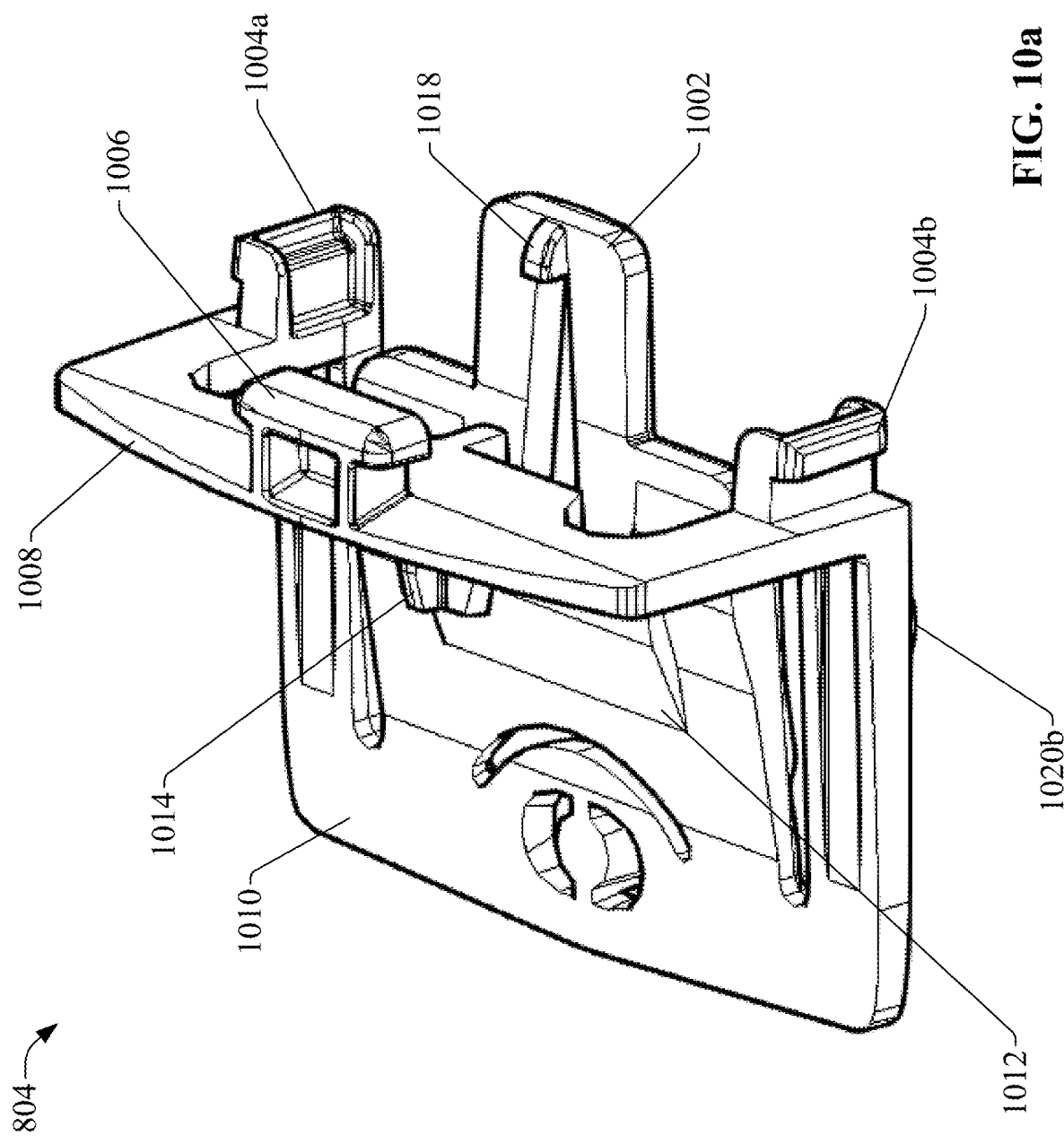
FIG. 10a is a perspective view of a mounting unit that can be used to affix the faceplate on the front of a fiber optic cassette.
Figure 10B:
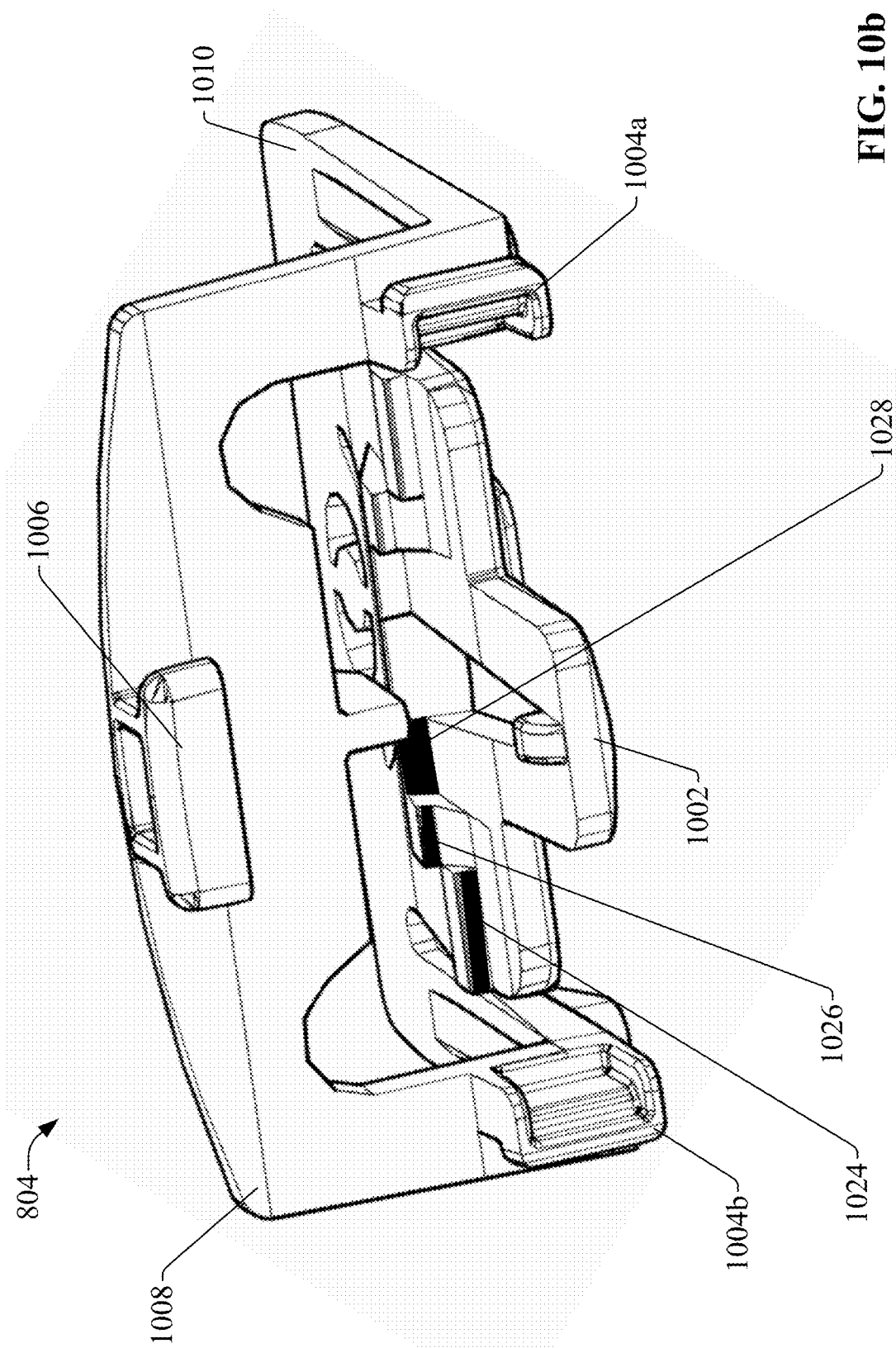
FIG. 10b is another perspective view of the mounting unit depicting three alternative engagement surfaces.
Figure 11:
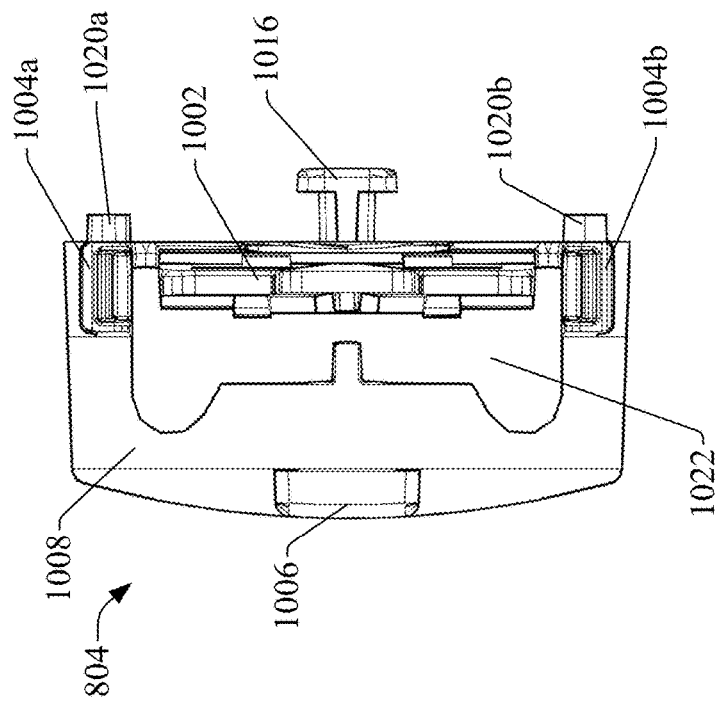
FIG. 11 is an orthographic projection view of the mounting unit.
Figure 11:
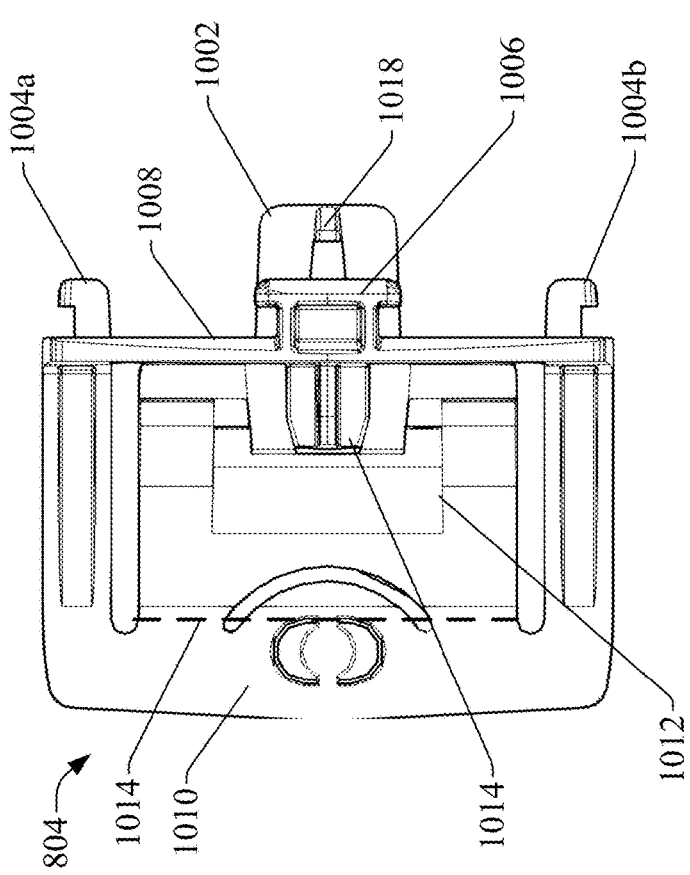
Figure 11:
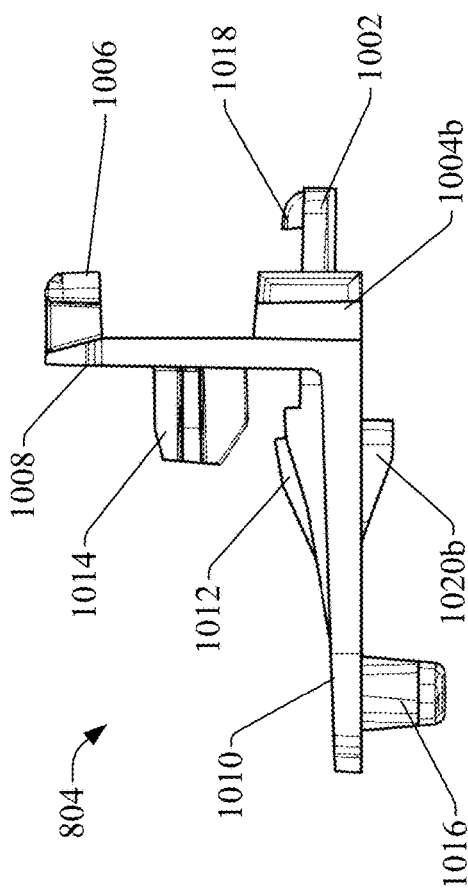

The faceplate 102 can be mounted to the front of the cassette 802 using mounting units 804 that are designed to clip onto the left end and right end of the faceplate 102, and to snap into place on the left and right sides of the front of the cassette 802, thereby holding the faceplate 102 in place on the cassette 802. FIG. 10a is a perspective view of a mounting unit 804 that can be used to affix the faceplate 102 on the front of a fiber optic cassette. FIG. 10b is another perspective view of the mounting unit 804 oriented to display various engagement points of the mounting unit. FIG. 11 is an orthographic projection view of the mounting unit 804. Mounting unit 804 can be made of a single piece of material, such as plastic or metal, and has a substantially L-shaped structure comprising a first section 1008 and a second section 1010 that are at a substantially right angle to one another. Two hooks 1004a, 1004b are formed on the two corners, respectively, of the outward-facing surface of the first section 1008 adjacent to the corners at which the first section 1008 meets the second section 1010 (the outward-facing surface of the first section 1008 being the surface facing away from the second section 1010). The hooks 1004a, 1004b are oriented in opposite directions, such that the hooks 1004a, 1004b face away from the middle of the first section 1008. A T-shaped protrusion 1006 is formed in the middle of the edge of the first section 1008 (that is, the edge opposite the corners at which the first section 1008 meets the second section 1010). The T-shaped protrusion 1006 is oriented to face toward the second section 1010.

A flexible spring-loaded clip 1012 is formed on the second section 1010 of the mounting unit 804. An inward-facing surface of the clip 1012 (that is, the surface facing in the direction of the first section 1008) is inclined toward the first section 1008. The clip 1012 comprises a middle portion of the second section 1010 that is attached to the remaining portion of the second section 1010 along a line 1014 (see FIG. 11) that acts as a hinge for the clip 1012. Applying pressure to the inclined surface of the clip 1012 causes the clip 1012 to flexibly pivot about line 1014. A tab 1002 extends from the edge of the clip 1012 opposite the hinge line 1014, extending through an opening 1022 in the first section 1008. A raised protrusion 1018 is formed on the end of the tab 1002. A peg 1016 is formed on the outward-facing surface of the second section 1010 (that is, the surface of the second section 1010 facing away from the first section 1008) near the edge of the second section 1010 opposite the joint between the first section 1008 and the second section 1010. As can be seen in FIG. 11, peg 1016 has a T-shaped profile when viewed along the surface of the second section 1010. Two inclined protrusions 1020a and 1020b are formed on either side of the clip 1012 on the same surface of the second section 1010 on which the peg 1016 is formed.

As can be seen in FIG. 10b, three different latch engagement surfaces 1024, 1036, and 1028 (shaded black in FIG. 10b) are formed on the second section 1010 on either side of the tab 1002 and face toward the opening 1022 of the first section 1008. These three latch engagement surfaces 1024 can accommodate different product interfaces, allowing the same mounting unit 804 to be used to as a connectivity solution for different types of fiber optic cassettes having respective different engagement mechanisms.

Figure 12:
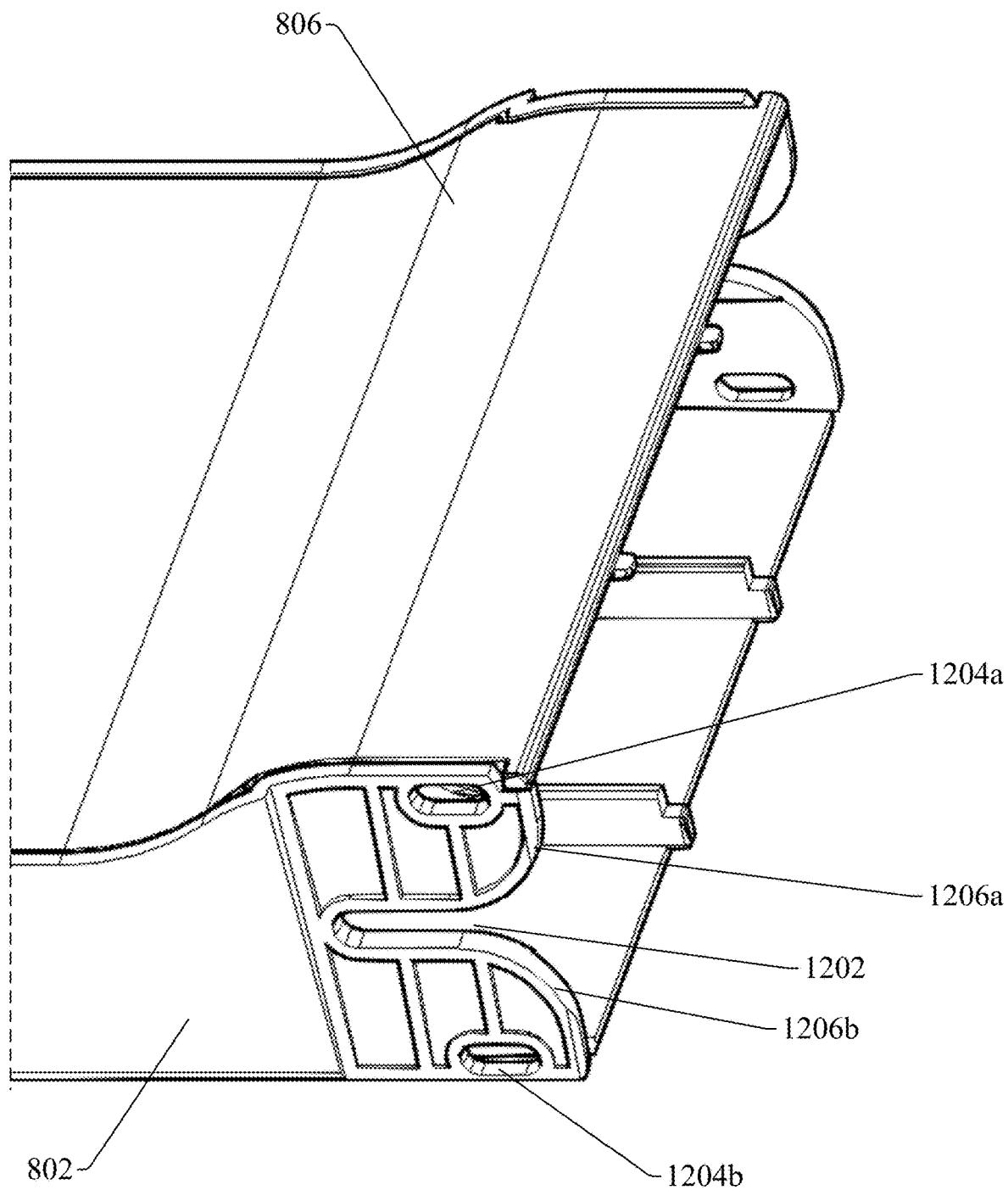
FIG. 12 is a perspective view of the front side of the fiber optic cassette with the faceplate and mounting units removed.
Figure 13:
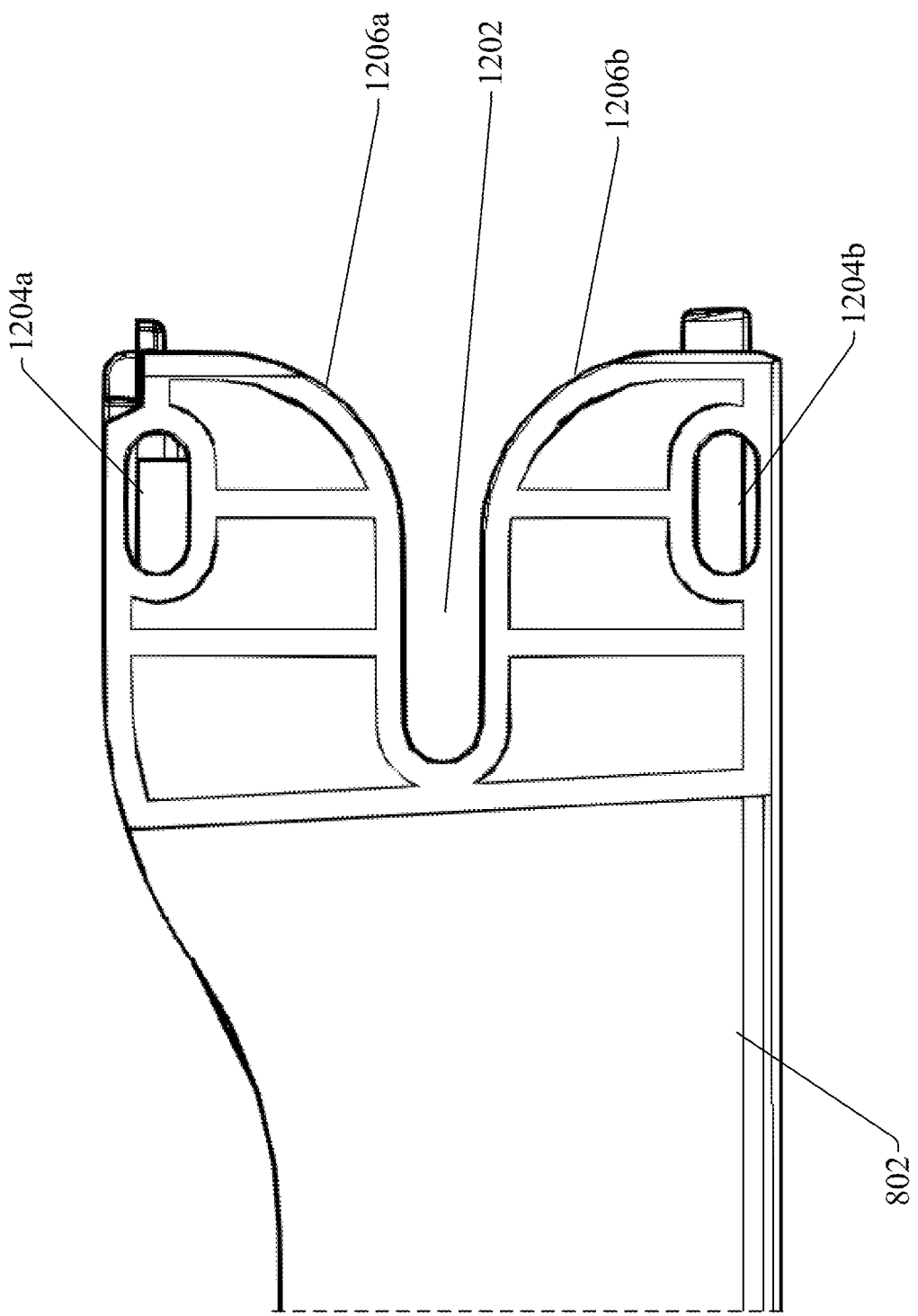
FIG. 13 is a close-up side view of the cassette showing the profile of the front portion of a vertical wall of the cassette.

FIG. 12 is a perspective view of the front side of the fiber optic cassette 802 with the faceplate 102 and mounting units 804 removed. FIG. 13 is a close-up side view of the cassette 802 showing the profile of the front portion of a vertical wall of the cassette 802. To accommodate the mounting units 804, elongated recesses 1202 can be formed in the profiles of the front sections of the two vertical walls of the cassette 802. These recesses 1202 open toward the front of the cassette 802. The two corners 1206a, 1206b of each recess 1202 are curved to assist in guiding the mounting units 804 into place. Two holes 1204a and 1204b are formed near the top and bottom edges, respectively, of the front portion of the vertical wall.

Figure 14:
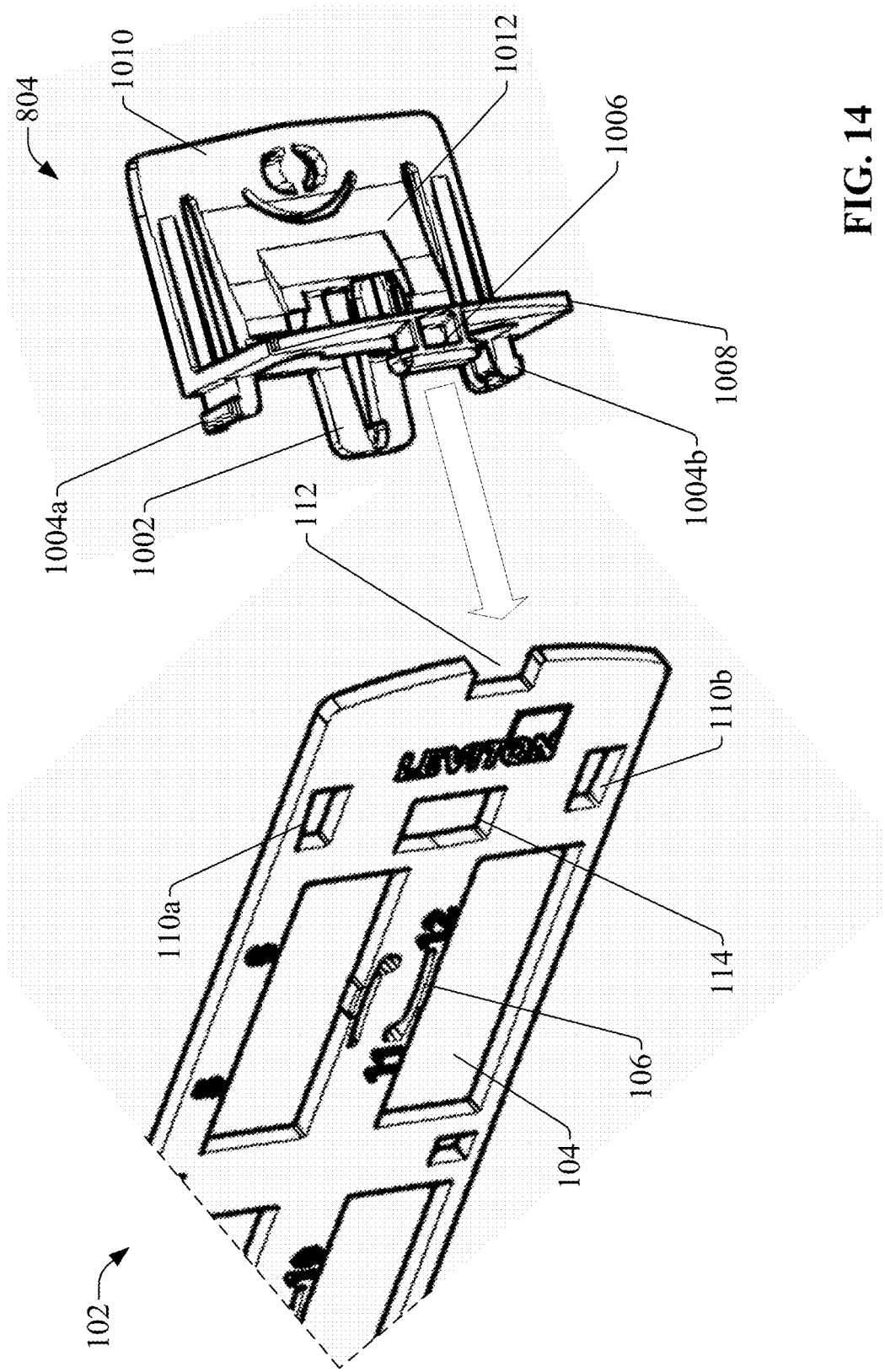
FIG. 14 is a perspective view of the faceplate with a mounting unit aligned for installation on the faceplate.
Figure 15:
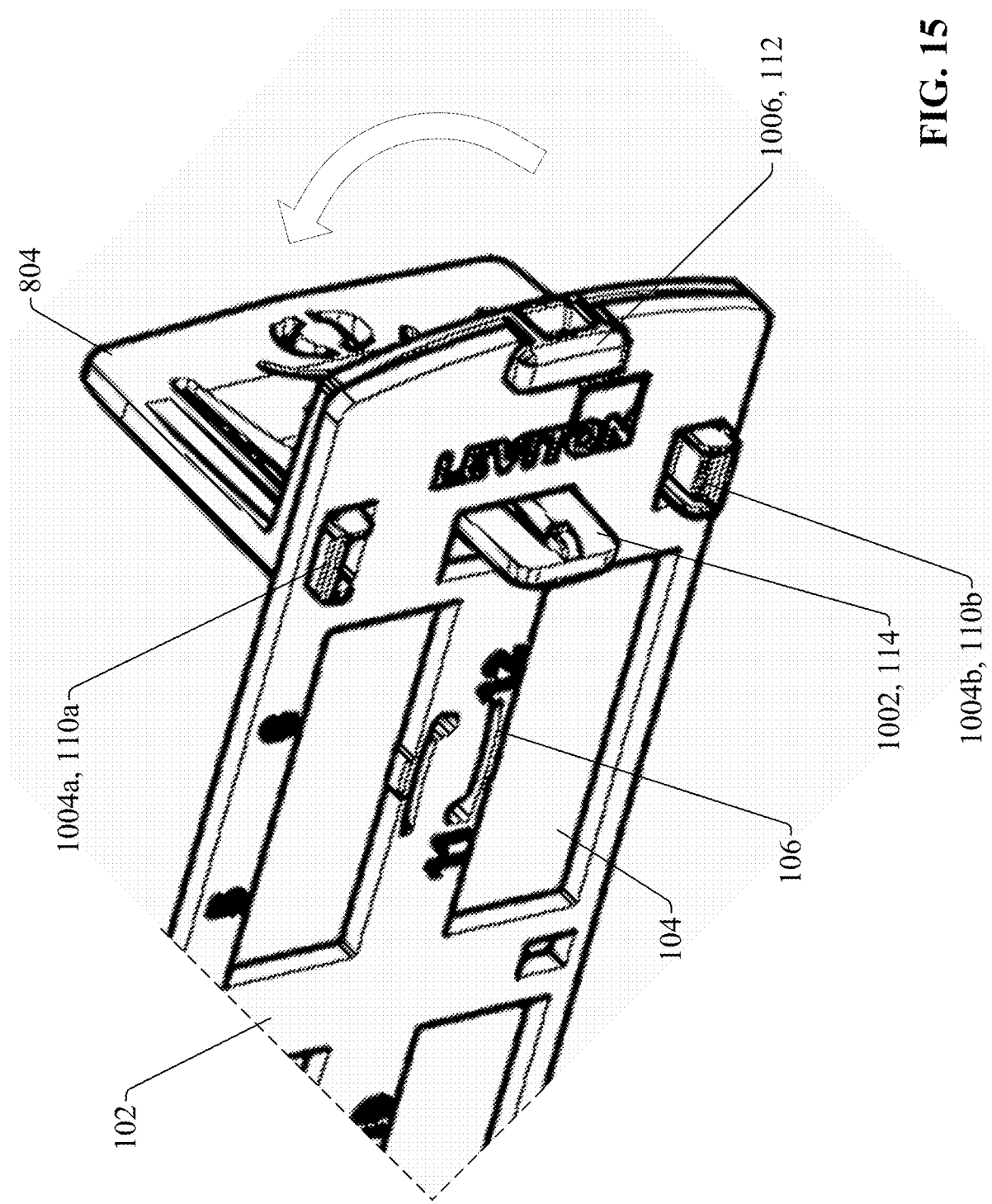
FIG. 15 is a perspective view of the faceplate and the mounting unit illustrating the final engagement action between the two.

FIG. 14 is a perspective view of the faceplate 102 with a mounting unit 804 aligned for installation on the faceplate 102. To install the mounting unit 804 to the left end or right end of the faceplate, the T-shaped protrusion 1006 is first engaged with the notch 112 formed on the edge of the faceplate 102. This provides stability between the mounting unit 804 and the faceplate 102 prior to engaging the two hooks 1004a, 1004b with the upper and lower mounting holes 110a, 110b. FIG. 15 is a perspective view of the faceplate 102 and the mounting unit 804 illustrating the final engagement action between the two. With the T-shaped protrusion 1006 engaged with the notch 112, the mounting unit 804 is pivoted toward the faceplate 102 about the notch 112, which brings the two hooks 1004a, 1004b of the mounting unit 804 into engagement with the two corresponding holes mounting holes 110a, 110b of the faceplate 102. This pivoting action also causes the tab 1002 of the mounting unit 804 to engage with the middle mounting hole 114 near the end of the faceplate 102.

Figure 16:
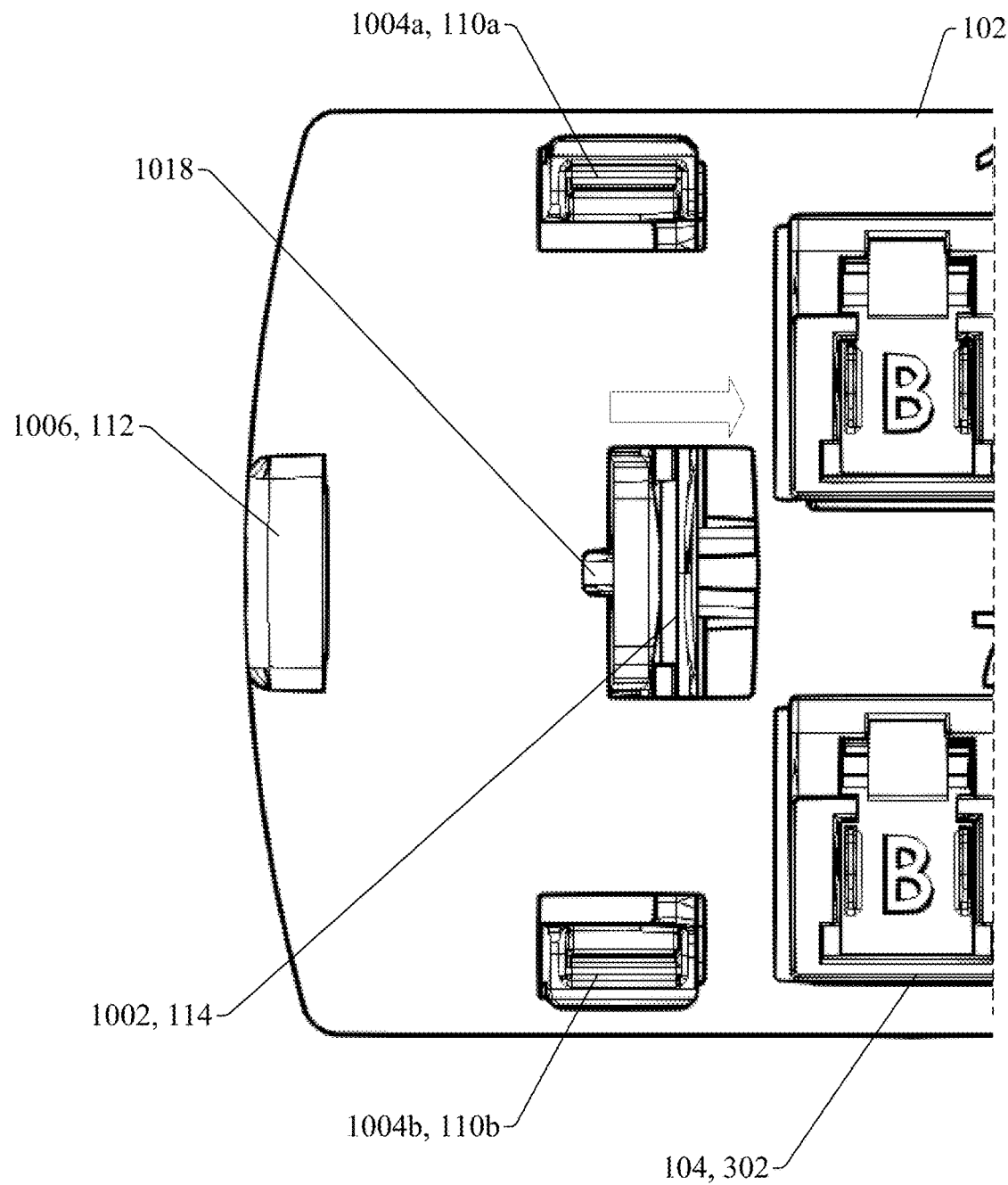
FIG. 16 is a close-up front view of the left side of the front of the cassette with the faceplate mounted to its front.

FIG. 16 is a close-up front view of the left side of the resulting faceplate assembly, comprising the faceplate 102 and the mounting unit 802. Faceplate 102 is held in place by the engagement of the hooks 1004a, 1004b of the left-side and right-side mounting units 804 with the corresponding pair of mounting holes 110a, 110b of the faceplate 102, the engagement of the tabs 1002 of the two mounting units 804 with the middle mounting holes 114 near the left and right ends of the faceplate 102, and the engagement of the T-shaped protrusions 1006 of the two mounting units 804 with the notches 112 on the left and right edges of the faceplate 102. As can be seen in FIG. 16, the tabs 1002 of the two mounting units and the middle mounting holes 114 of the faceplate 102 are oriented such that, while the faceplate 102 is mounted, the raised protrusion 1018 on each tab 1002 engages with an edge of its corresponding middle mounting hole 114 (specifically, the edge that faces toward the end of the faceplate 102 nearest to the tab 1002). Since the tab 1002 can flexibly bend toward the middle of the faceplate 102 and the raised protrusion 1018 is ramped, the tab 1002 flexes toward the middle of the faceplate 102 (in the direction of the arrow in FIG. 16) as the mounting unit 804 is pivoted toward the faceplate 102 to allow the tab 1002 to pass through the middle mounting hole 114. Once the middle mounting hole 114 has moved past the raised protrusion 1018, the spring-loaded compression force acting against the flexing of tab 1002 causes the tab 1002 to snap back to its resting position (or near its resting position), causing the tab 1002 to abut against the edge of the middle mounting hole 114 and causing the raised protrusion 1018 to engage with this edge.

Figure 17:
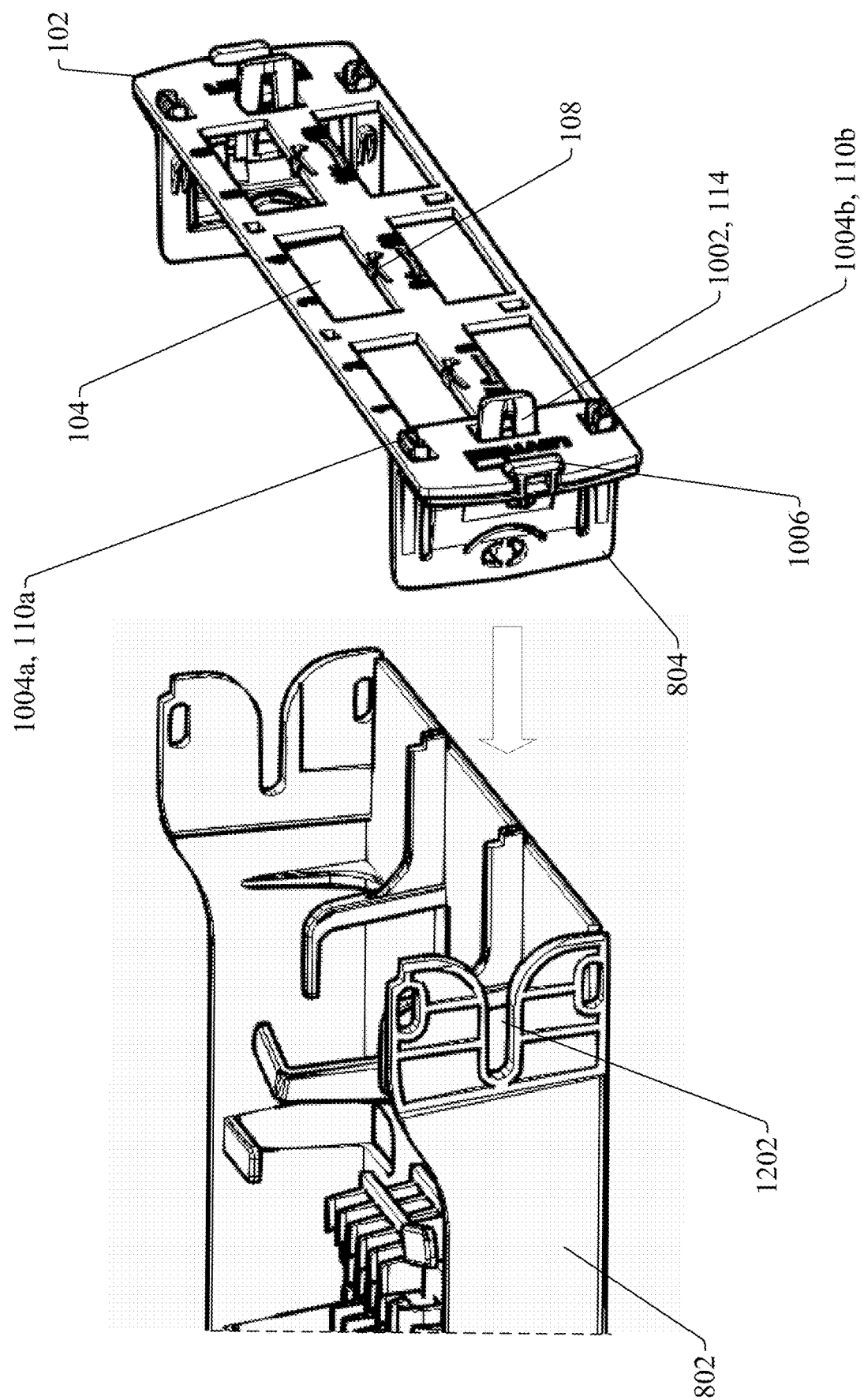
FIG. 17 is a perspective view of the fiber optic cassette, with the faceplate aligned for installation on the cassette.
Figure 18:
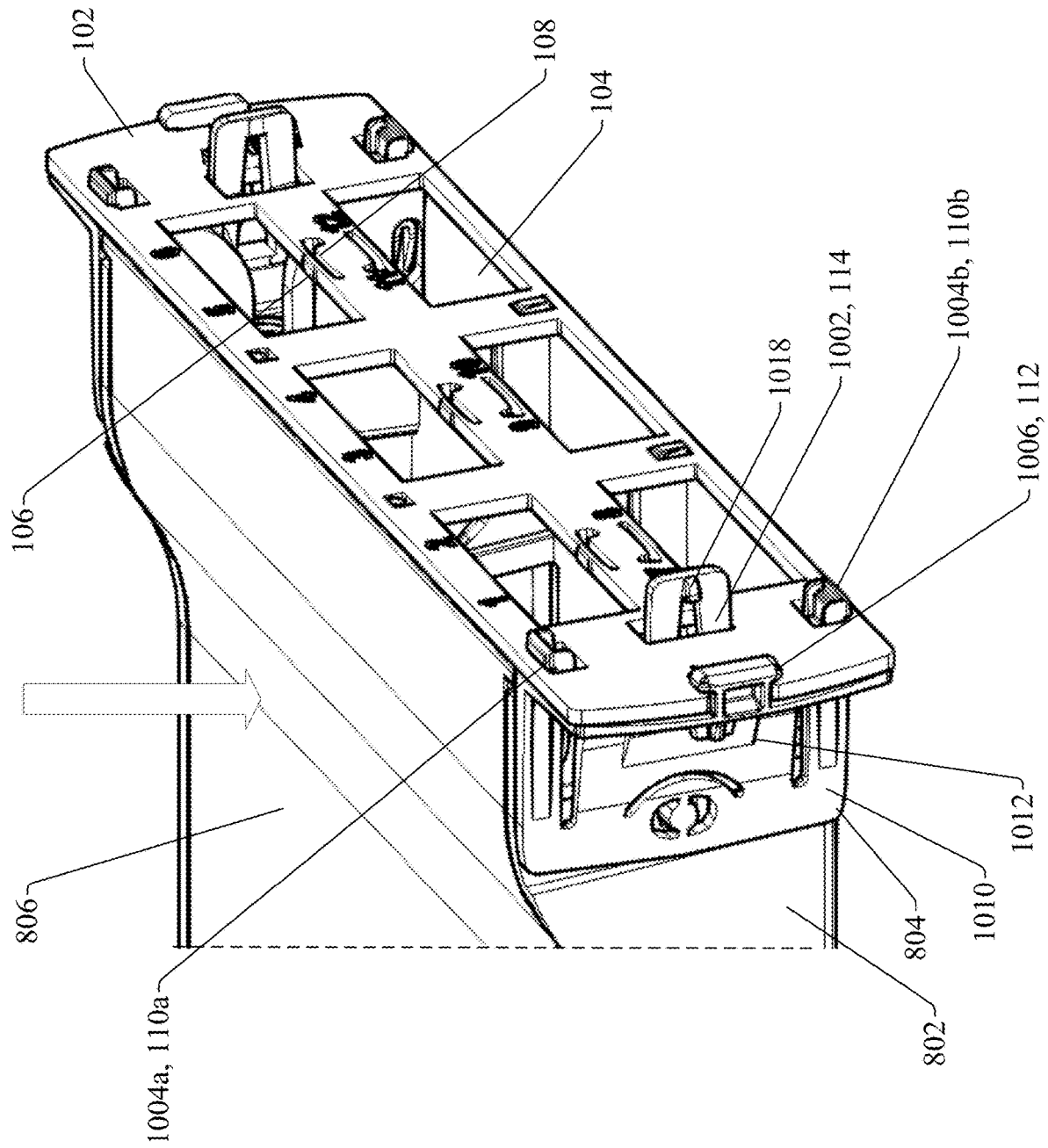
FIG. 18 is a perspective view of the fiber optic cassette with the faceplate mounted to its front using mounting units.
Figure 19:
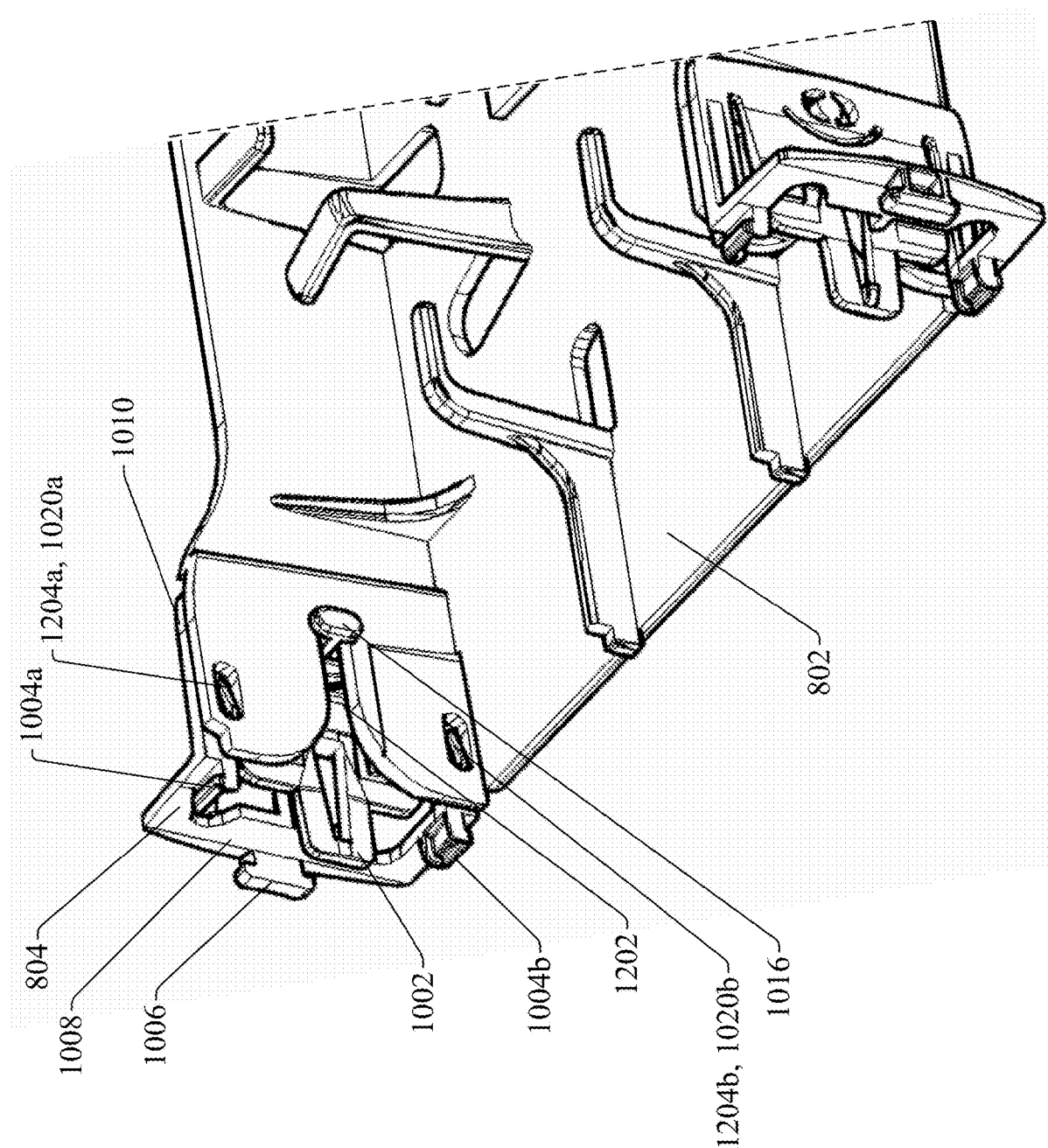
FIG. 19 is a perspective view of the cassette with the faceplate omitted to depict the interface between a mounting unit and an elongated recess of the cassette.

A mounting unit 804 can be installed on each of the left and right ends of the faceplate 102 in this manner. Since the mounting units 804 are symmetrical, a mounting unit 804 can be selectively installed on either the left or right end of the faceplate 102, and there is no need to design separate left-side and right-side mounting units 804. Once installed on the faceplate 102, the mounting units 804 can be used to attach the faceplate 102 to the front of the fiber optic cassette 802. FIG. 17 is a perspective view of the fiber optic cassette 802, with faceplate 102 aligned for installation on the cassette 802. FIG. 18 is a perspective view of the fiber optic cassette 802 with the faceplate 102 mounted to its front using mounting units 804. To install the faceplate 102 on the cassette 802, the faceplate 102 is aligned with the cassette 802 such that the pegs 1016 of the two mounting units 804 are aligned with their corresponding recess 1202 of the cassette 802. This alignment is performed while the cassette's top cover 806 is removed, to allow a degree of flexibility in the cassette's side walls as the faceplate assembly is being installed. The faceplate assembly—comprising faceplate 102 and its two mounting units 804—can then be slid into place such that the pegs 1016 of the mounting units 804 are inserted into the recesses 1202 of the cassette 802. FIG. 19 is a perspective view of the cassette 802 with the faceplate 102 omitted to depict the interface between a mounting unit 804 and an elongated recess 1202. As can be seen in this view, the two facing edges of the recess 1202 are received in the two sides, respectively, of the peg's T-shaped profile as the peg 1016 is inserted. The mounting unit 804 can continue to be inserted into the recess 1202 until the two inclined protrusions 1020a and 1020b engage with holes 1204a and 1204b, respectively, of the cassette 802, which locks the mounting units 804 in place. The cassette's top cover 806 can then be installed, as shown in FIG. 17.

To disengage the faceplate 102 from the cassette 802, the flexible tabs 1002 of the two mounting units 804 can be flexed inward toward the middle of the faceplate 102 (in the direction of the arrow in FIG. 16) to disengage the raised protrusions 1018 from the edges of the middle mounting holes 114, and the faceplate 102 can then be disengaged from the hooks 1004a, 1004b and the T-shaped protrusion 1006.

Figure 20:
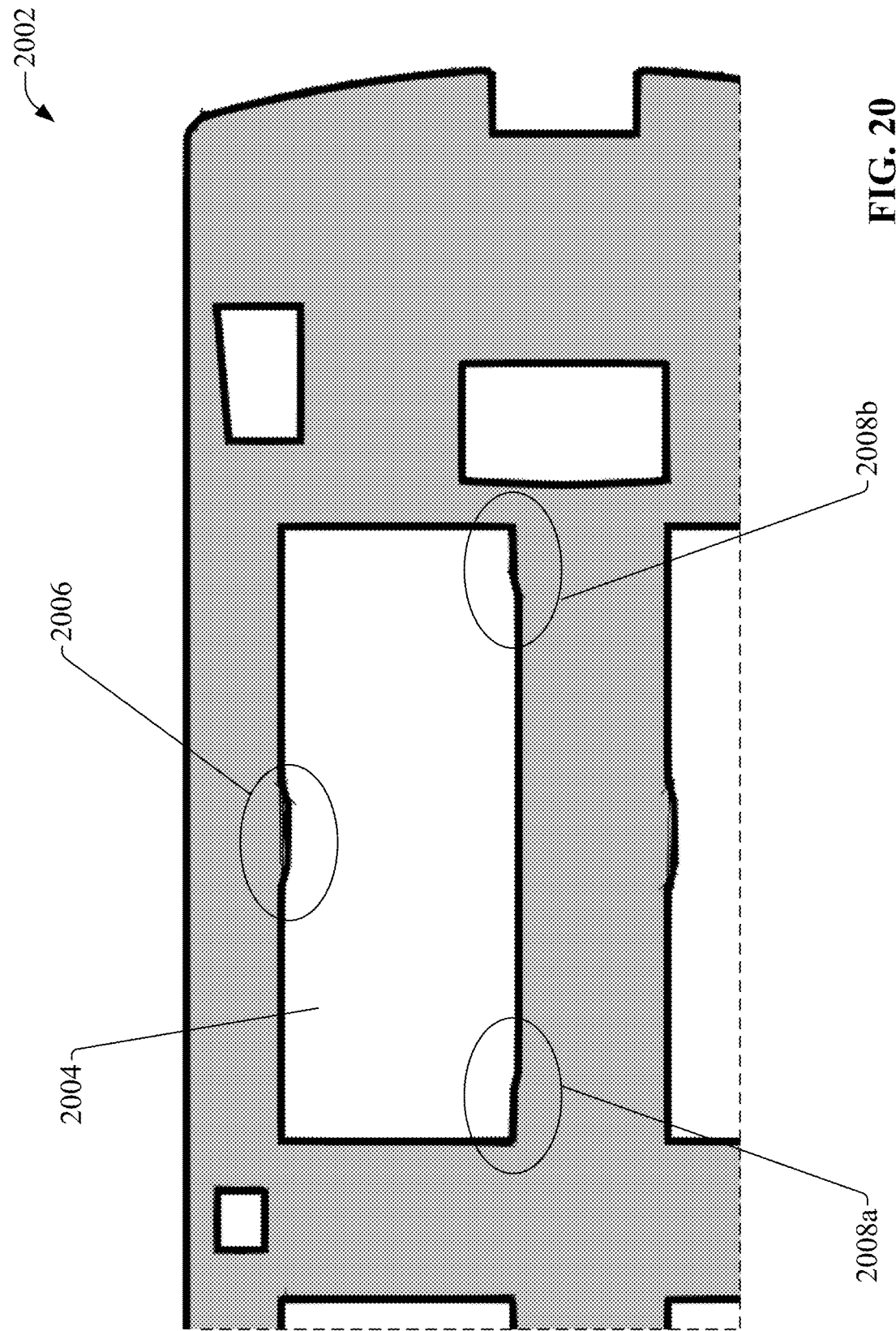
FIG. 20 is close-up front view of another example fiber optic faceplate that incorporates additional raised buttons on each of its port openings.

FIG. 20 is close-up front view of another example fiber optic faceplate 2002 that incorporates additional raised buttons on each of its port openings 2004. Similar to faceplate 102, each port opening 2004 on faceplate 2002 includes a raised button 2006 formed at or near the middle of a vertical edge of the port opening 2004. Additionally, two other raised buttons 2008a and 2008b are formed on or near the corners of the opposing vertical edge of the port opening 2004. When an adapter 302 is installed in the port opening 2004, buttons 2006, 2008a, and 2008b make contact with the three corresponding locations of the adapter 302, yielding a tight engagement between the adapter 302 and the port opening 2004. Some embodiments of faceplate 2002 may include curved relief slots formed adjacent to raised button 2006 (similar to curved slot 108 of faceplate 102). Alternatively, the curved slots may be omitted, as depicted in FIG. 20.

Figure 21:
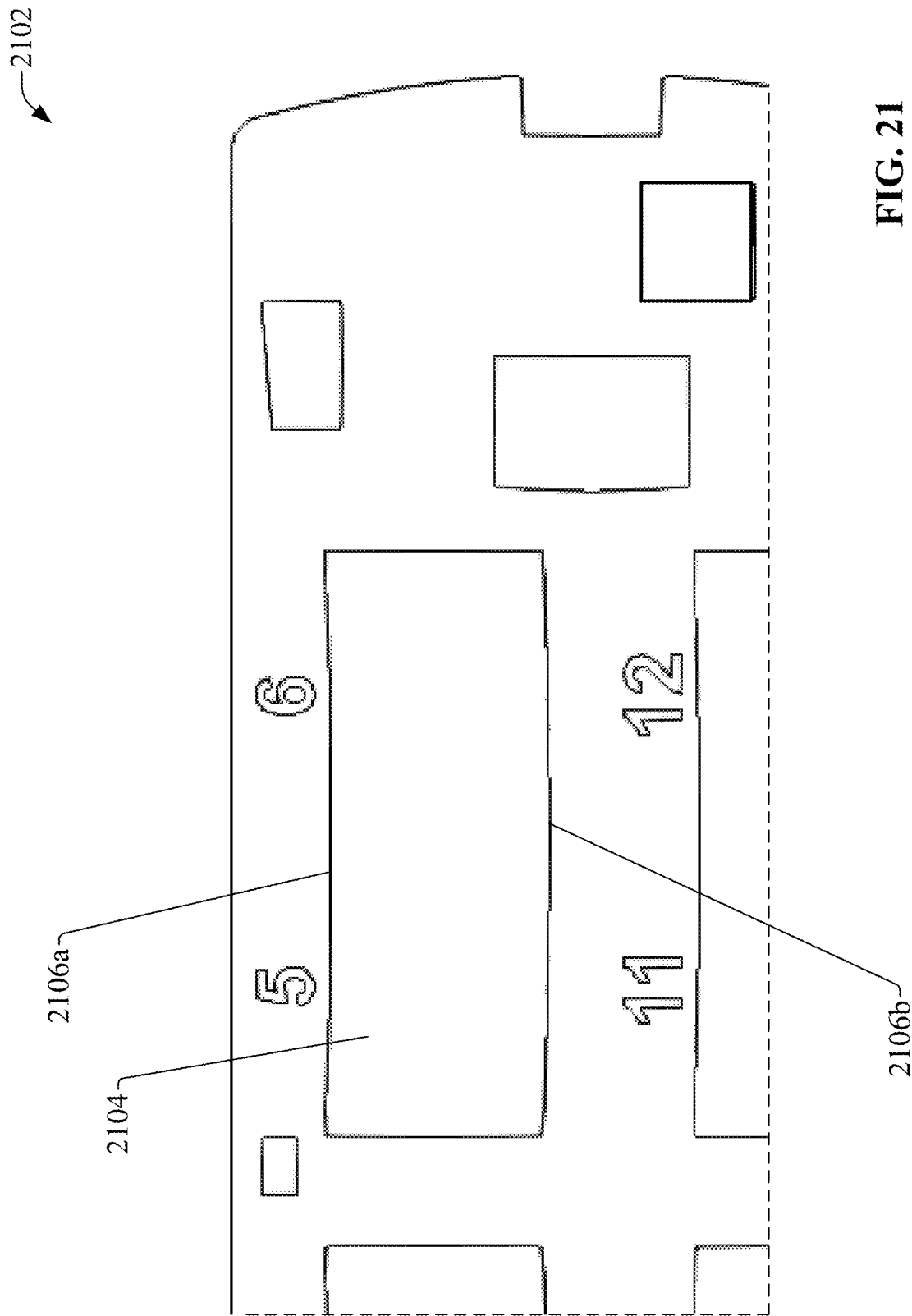
FIG. 21 is close-up front view of another example fiber optic faceplate comprising curved port openings.
Figure 22:
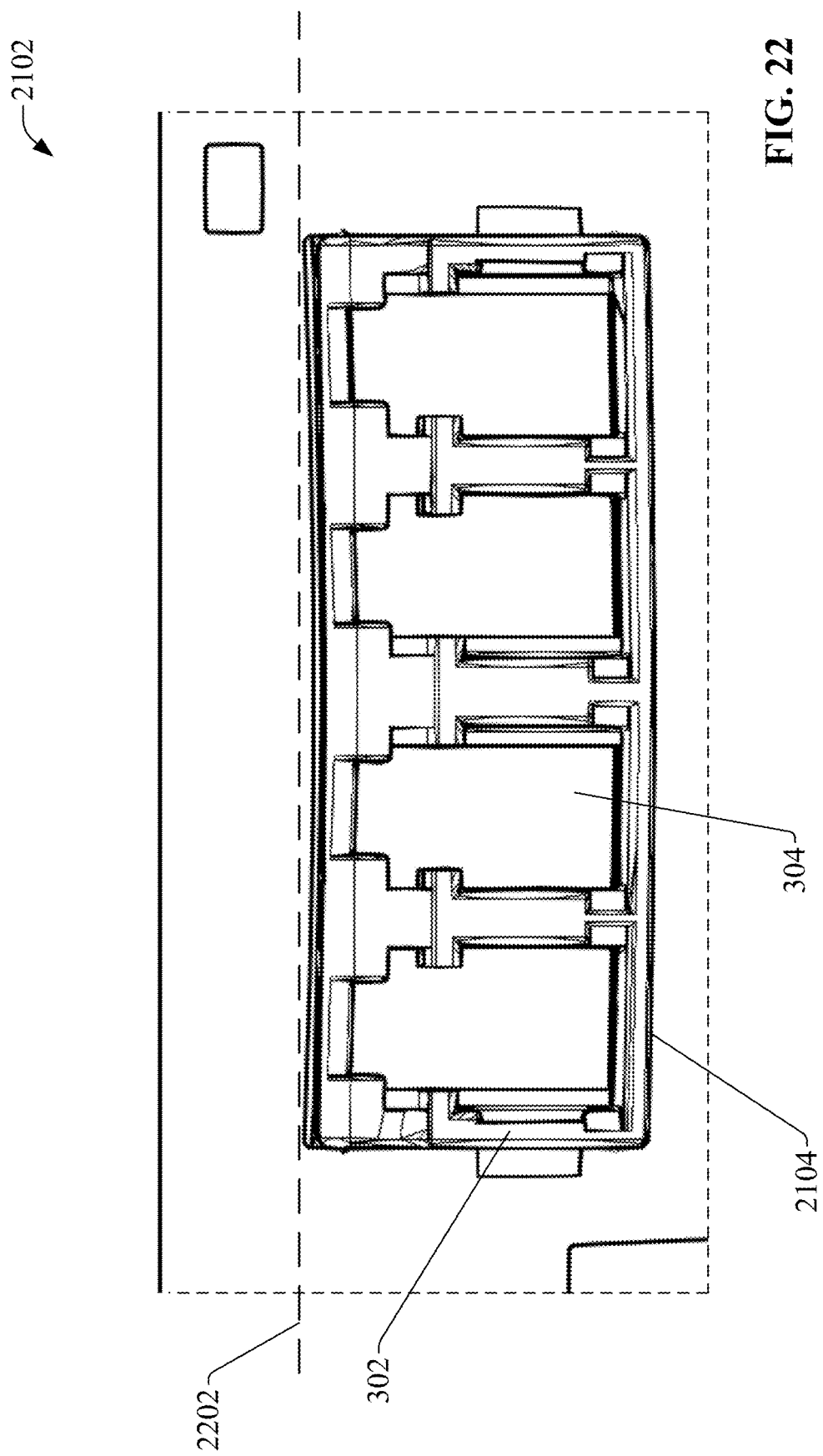
FIG. 22 is another close-up front view of the example fiber optic faceplate comprising curved port openings with an adapter installed in one of the port openings.

FIG. 21 is close-up front view of another example fiber optic faceplate 2102 comprising curved port openings 2104. In this example, the top edge 2106a and bottom edge 2106b of each port opening 2104 are curved or arched in the same direction (e.g., toward the top edge or bottom edge of the faceplate 2102), yielding a port opening 2104 having an arched shape. When an adapter 302 having a rectangular profile is installed into the port opening 2104, the arched shape of the port opening 2104 applies a bending force to the adapter 302, yielding a tight fit. FIG. 22 is a close-up front view of the fiber optic faceplate 2102 with an adapter 302 installed in one of the port openings 2104. As can be seen in this view, the arched shape of the port opening 2104 applies a bending force to the adapter 302 while the adapter 302 is installed in the port opening 2104, causing a slight elastic deformation or distortion of the adapter 302 that results in the top and bottom surfaces of the adapter 302 to arch away from the horizontal (as can be seen by comparing the top edge of the adapter 302 with the dashed horizontal line 2202 in FIG. 22). This mechanical deformation results in a slight arching of the adapter 302. The force between the deformed adapter 302 and the edges of the arched port opening 2104 holds the adapter 302 tightly within the port opening 2104. In the example embodiment illustrated in FIGS. 21 and 22, the port openings 2104 do not include the raised buttons or curved slots 108 of the embodiments described above. However, raised buttons and/or curved slots 108 can be added to the embodiment depicted in FIGS. 21 and 22 without departing from the scope of this disclosure.

The port openings 104 of the fiber optic faceplate 102 described herein can yield a tighter engagement with fiber optic adapters 302 relative to ports with simpler geometries, thereby reducing or eliminating the ability of the adapters to slide or rattle within the openings 104. The port opening design achieves this secure fit without the need for additional mounting hardware, such as a second plate mounted on the rear side of the faceplate to hold the adapters in place. The flexible section 202 associated with each port opening 104 allows the opening 104 to accommodate, and securely hold, adapter housings having a range of vertical dimensions. The faceplate 102 can be mounted easily to a fiber optic cassette 802 using the modular mounting units 804 also described herein.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A fiber optic faceplate, comprising:
a flat plate; and
a port opening formed through the flat plate;
wherein
a raised button is formed on a horizontal edge of the port opening,
a curved slot is formed through the flat plate adjacent to the raised button, and
the curved slot and the horizontal edge of the port opening define a flexible section that flexes in response to a force applied to the raised button.

2. The fiber optic faceplate of claim 1, wherein
the port opening is configured to receive a fiber optic adapter,
insertion of the fiber optic adapter into the port opening causes the fiber optic adapter to apply the force to the raised button, and
a compression force created by the flexible section while the flexible section is flexed acts against the fiber optic adapter while the fiber optic adapter is installed in the port opening.

3. The fiber optic faceplate of claim 1, wherein the flexible section comprises a middle section that is tapered relative to ends of the flexible section.

4. The fiber optic faceplate of claim 1, wherein the flat plate comprises a metal material.

5. The fiber optic faceplate of claim 1, wherein the fiber optic faceplate is configured to engage with mounting units that hold the fiber optic faceplate on a front side of a fiber optic cassette.

6. The fiber optic faceplate of claim 5, wherein
a mounting unit, of the mounting units, comprises a first section and a second section that are formed at a substantially right angle to one another,
the second section is configured to engage with the fiber optic cassette, and
the first section is configured to engage with the fiber optic faceplate.

7. The fiber optic faceplate of claim 6, wherein
a flexible clip is formed on the second section of the mounting unit,
the flexible clip comprises a tab that extends through an opening in the first section of the mounting unit,
the fiber optic faceplate further comprises a mounting hole formed through the flat plate,
the tab is configured to pass through the mounting hole as the fiber optic faceplate is mounted to the mounting unit, and
a raised protrusion formed on the tab is configured to engage with an edge of the mounting hole.

8. The fiber optic faceplate of claim 6, wherein
a first hook and a second hook are formed on two corners, respectively, of the first section of the mounting unit, and
the fiber optic faceplate further comprises mounting holes configured to engage with the first hook and the second hook, respectively.

9. The fiber optic faceplate of claim 6, wherein
a T-shaped protrusion is formed on an edge of the first section of the mounting unit,
the fiber optic faceplate further comprises a notch formed on a left-most edge or a right-most edge of the flat plate, and
the notch is configured to engage with the T-shaped protrusion while the fiber optic faceplate is mounted on the mounting unit.

10. A system, comprising:
a faceplate comprising a port opening configured to hold a fiber optic adapter,
wherein
the port opening comprises a raised protrusion formed on a horizontal edge of the port opening,
the faceplate further comprises a curved slot formed through the faceplate,
a flexible section is formed between the curved slot and the horizontal edge of the port opening, and
the flexible section deflects in response to a force applied to the raised protrusion.

11. The system of claim 10, wherein
insertion of the fiber optic adapter into the port opening causes the fiber optic adapter to apply the force to the raised protrusion, and
a compression force created by the flexible section while the flexible section is deflected causes the raised protrusion to press against the fiber optic adapter while the fiber optic adapter is installed in the port opening.

12. The system of claim 10, wherein a middle portion of the flexible section is tapered relative to ends of the flexible section.

13. The system of claim 10, wherein the faceplate comprises a metal material.

14. The system of claim 10, further comprising a mounting unit configured to attach to a front of a fiber optic cassette and to hold the faceplate on the front of the fiber optic cassette.

15. The system of claim 14, wherein
the mounting unit comprises a first section and a second section,
the first section and the second section are formed at a substantially right angle to one another,
the second section is configured to engage with the fiber optic cassette, and
the first section is configured to engage with the faceplate.

16. The system of claim 15, wherein
a flexible clip is formed on the second section of the mounting unit,
the flexible clip comprises a tab that extends through an opening in the first section of the mounting unit,
the faceplate further comprises a mounting hole,
the tab is configured to pass through the mounting hole as the faceplate is installed on the mounting unit, and
a raised protrusion formed on the tab is configured to engage with an edge of the mounting hole.

17. The system of claim 15, wherein
a first hook and a second hook are formed on two corners, respectively, of the first section of the mounting unit, and
the faceplate further comprises mounting holes configured to engage with the first hook and the second hook, respectively.

18. The system of claim 15, wherein the mounting unit is configured to be selectively attached to either of a left-side vertical wall of the fiber optic cassette or a right-side vertical wall of the fiber optic cassette.

19. A system for mounting fiber optic adapters, comprising:
a flat plate through which is formed a port opening configured to hold a fiber optic adapter and a curved slot near a horizontal edge of the port opening,
wherein
a flexible section is formed between the horizontal edge and the curved slot,
a raised button is formed on the horizontal edge, and
the flexible section flexes in response to a force applied to the raised button.

20. The system of claim 19, wherein
insertion of the fiber optic adapter into the port opening causes the fiber optic adapter to apply the force to the raised button, and
the raised button applies a compression force against the fiber optic adapter while the fiber optic adapter is installed in the port opening.

* * * * *